(12) United States Patent
Sawada et al.

(10) Patent No.: US 7,573,298 B2
(45) Date of Patent: *Aug. 11, 2009

(54) SIGNAL TRANSMISSION CIRCUIT, DATA TRANSFER CONTROL DEVICE AND ELECTRONIC DEVICE

(75) Inventors: Mitsuaki Sawada, Suwa (JP); Shoichiro Kasahara, Minowa (JP)

(73) Assignee: Seiko Epson Corporation (JP)

( * ) Notice: Subject to any disclaimer, the term of this patent is extended or adjusted under 35 U.S.C. 154(b) by 4 days.

This patent is subject to a terminal disclaimer.

(21) Appl. No.: 11/562,137

(22) Filed: Nov. 21, 2006

(65) Prior Publication Data

US 2007/0121264 A1 May 31, 2007

(30) Foreign Application Priority Data

Nov. 25, 2005 (JP) ............................. 2005-340763
Jul. 7, 2006 (JP) ............................. 2006-187812

(51) Int. Cl.
*H03K 19/003* (2006.01)
*H03K 19/0175* (2006.01)
*H03K 19/094* (2006.01)

(52) U.S. Cl. ............................. 326/82; 326/30; 326/80; 326/86; 327/108

(58) Field of Classification Search ................... 326/30, 326/82, 86, 80; 327/108
See application file for complete search history.

(56) References Cited

U.S. PATENT DOCUMENTS

| 6,825,693 | B2 * | 11/2004 | Schoenborn et al. | 326/86 |
| 7,268,578 | B2 * | 9/2007 | Komatsu | 326/27 |
| 2002/0041193 | A1 * | 4/2002 | Tamura et al. | 326/86 |
| 2004/0246026 | A1 * | 12/2004 | Wang et al. | 326/86 |

FOREIGN PATENT DOCUMENTS

| JP | 2002-343864 | 11/2002 |
| JP | 2005-340946 | 12/2005 |

* cited by examiner

*Primary Examiner*—Vibol Tan
*Assistant Examiner*—Matthew C Tabler
(74) *Attorney, Agent, or Firm*—Harness, Dickey & Pierce, P.L.C.

(57) ABSTRACT

A signal transmission circuit transmitting signals via first and second signal lines that provide a differential pair, includes: a current source installed between a first power source and a given node; a first switching element installed between the first signal line and the node; a second switching element installed between the second signal line and the node; a current control circuit varying a value of a current that flows from the constant current circuit, wherein the first and second signal lines are operated by the current from the constant current circuit via the first and second switching elements, the current being varied by the current control circuit.

4 Claims, 19 Drawing Sheets

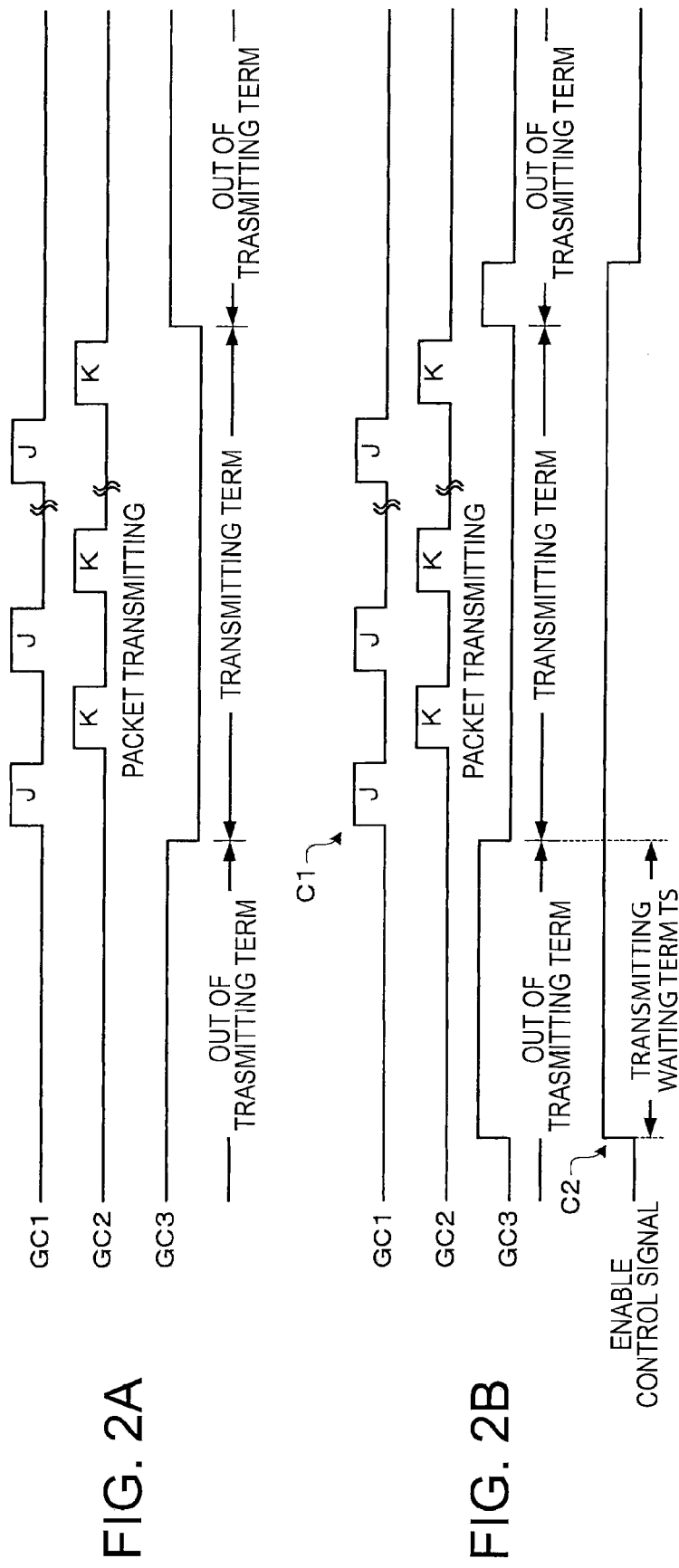

$$\frac{rt+rr}{rt \times rr} \times vmin \leq ihs \leq \frac{rt+rr}{rt \times rr} \times vmax$$

$$\left(\frac{rt+rrl}{rt \times rrl} \times vmin \leq ihs \leq \frac{rt+rrh}{rt \times rrh} \times vmax\right)$$

| VHSOH | 360 (vmin) | 440 (vmax) | mV |
|---|---|---|---|
| reterm | 40.5 (rtl,rrl) | 49.5 (rth,rrh) | Ω |

FIG. 4A

| VHSOH | 360 (vmin) | 400 (vtyp) | 440 (vmax) | mV |
|---|---|---|---|---|
| ihs | 16.00 | 17.78 | 19.56 | mA |

FIG. 4B

| rt (TRANSMISSING SIDE) | rr (RECEIVING SIDE) | VHSOH | ihs |
|---|---|---|---|
|  |  |  |  |
| 40.5 | 49.5 | 440 | 19.75309 |
| 40.5 | 40.5 | 440 | 21.7284 |
| B7→ 40.5 | 40.5 ←B6 | 360 | 17.77778 ←B8 |
| 40.5 | 49.5 | 360 | 16.16162 |
|  |  |  |  |
| 45 | 49.5 ←B4 | 440 | 18.66667 ←B5 |
| 45 | 40.5 | 440 | 20.64198 |
| 45 | 40.5 ←B2 | 360 | 16.88889 ←B3 |
| 45 | 49.5 | 360 | 15.27273 |
|  |  |  |  |
| B10→ 49.5 | 49.5 ←B9 | 440 | 17.77778 ←B11 |
| 49.5 | 40.5 | 440 | 19.75309 |
| 49.5 | 40.5 | 360 | 16.16162 |
| 49.5 | 49.5 | 360 | 14.54545 |
|  |  |  |  |
| B1→ 45 | 45 | 400 | 17.77778 |

FIG. 6

SIGNAL TRANSMISSION CIRCUIT, DATA TRANSFER CONTROL DEVICE AND ELECTRONIC DEVICE

The entire disclosure of Japanese Patent Application Nos. 2005-340763, filed Nov. 25, 2005, and 2006-187812, filed Jul. 7, 2006, are expressly incorporated by reference herein.

BACKGROUND OF THE INVENTION

1. Technical Field

The present invention relates to a signal transmission circuit, a data transfer control and an electronic device.

2. Related Art

In the universal serial bus (USB) 2.0, a transmission mode called a high speed (HS) mode is prepared in addition to a full speed (FS) mode defined in the old USB 1.1. In the HS mode, data is transmitted with 480 Mbps, realizing high speed data transmission, compared to the FS mode, in which data are transmitted with 12 Mbps.

The signal transmission circuit for the HS mode includes a constant current circuit for generating a high-level voltage (400 mV) for transmission and operates differential signal lines DP (Data+) and DM (Data−) of USB by using a constant current (17.8 mA) generated by the constant current circuit.

In the HS mode, however, the transmission rate is high, like a theoretical value of 480 Mbps. Further, products that clearly do not observe a standard such as the eye pattern of USB exist in the market. Hence, in the case when data transmission control devices at a receiving side do not observe the USB standard, data may not be normally transmitted even when a transmission side observes the USB standard.

JPA 2002-344864 is an example of related arts.

SUMMARY

The advantage of the present invention is to provide a signal transmission circuit or data transfer control device being capable of adjusting amplitude of an output signal and an electronic device including such device.

According to a first aspect of the invention, a signal transmission circuit transmitting signals via first and second signal lines that provide a differential pair, includes: a constant current circuit installed between a first source and a given node; a first switching element installed between the first signal line and the node; a second switching element installed between the second signal line and the node; a current control circuit varying a value of a current flowing from the constant current circuit. The first and second signal lines are operated by the current from the constant current circuit via the first or the second switching elements, the current being varied by the current control circuit.

According to the aspect of the invention, the value of the current flowing from the constant current circuit is not fixed, but varied by the current control circuit. When an initial level is set by the current control circuit, for example, the current having a first value from the constant current circuit operates the first or the second signal line (with current driving). When a second level is set, the current having a second value from the constant current circuit operates the first or the second signal line (with current driving). Namely, according to the invention, a value of a current flowing through a constant current circuit is a set variable, whereas the conventional circuit is designed so that such value is constant. This structure of the invention can adjust an amplitude of an output signal (an output high-level voltage and the like) of a signal transmission circuit, performing intelligent control for the output signal such as maintaining better signal wave, enabling the circuit to have low power consumption.

Here, vmin is a minimum value of an output high-level voltage of the signal transmission circuit, vmax is a maximum value of an output high-level voltage of the signal transmission circuit, rt is a value of the end terminal resistance of a transmitting side, rr is a value of the end terminal resistance of a receiving side and ihs is a value of the current flowing from the constant current circuit. Further, the range of the current flowing from the constant current circuit may satisfy the following relationship:

$$\{(rt+rr)/(rt*rr)\}*vmin \leq ihs \leq \{(rt+rr)/(rt*rr)\}*vmax.$$

This setting can control to vary the value of the current from the constant current circuit with observing the standard of a bus (a serial bus) for the first and second signal lines.

Here, the minimum value among the values of the end terminal resistance of the receiving side is rr1 and the maximum value thereof is rrh.

Further, the range of the current flowing from the constant current circuit may satisfy the following relationship:

$$\{(rt+rr1)/(rt*rr1)\}*vmin \leq ihs \leq \{(rt+rrh)/(rt*rrh)\}*vmax.$$

This setting can control to vary the value of the current from the constant current circuit with observing the standard of a bus, even if the end resistance value of a receiving side becomes small or large compared to a typical value.

Further, the signal transmission circuit of the invention may further include a first end terminal resistance circuit ending the first signal line; a second end terminal resistance circuit ending the second signal line; and an end terminal resistance control circuit varying a value of an end terminal of the first and second end terminal resistance circuits.

This structure can control the value of the current of the constant current circuit, as well as adjust an amplitude of an output signal of the signal transmission circuit (a output high-level voltage) by controlling the end terminal resistance value. Further, it becomes easy to do impedance matching with the end terminal resistance value at a receiving side. Further, the signal transmission circuit of the invention may further include a first fixed resistor installed between the first signal line and the first end terminal resistance circuit; and a second fixed resistor installed between the first signal line and the second end terminal resistance circuit.

This structure makes it possible to share the fixed resistor, downsizing the circuit. Further, the signal transmission circuit of the invention may further comprise a first buffer outputting a first transmission control signal to the gate of a first transistor formed in the first switching element; and a second buffer outputting a second transmission control signal to the gate of a second transistor formed in the second switching element. When any of the first transmission control signal and the second transmission control signal is set active, other of the control signals may be set normative. Each of the first and second buffers may include a first inverter and a second inverter receiving an output from the first inverter; and a capacitance adjustment circuit that is coupled to the output node of the first inverter. This structure can adjust the slew rate of the output signal.

The capacitance adjustment circuit of the invention may include at least one switching element for adjusting capacitance, of which an end is coupled to the output node of the first inverter, turned ON or OFF by a capacitance adjustment signal; and at least one capacitance element of which one end is coupled to the other end of the capacitance adjustment circuit and the other end is coupled to a second power source.

This circuit for adjusting capacitance can adjust a wiring capacitance of the output node of the first inverter thereby.

The constant current circuit of the invention may include: a standard current generating circuit; first to J numbered current sources flowing current based on a bias voltage from the standard current generating circuit; and first to J numbered switching elements for controlling current, which are coupled to first to J numbered current sources respectively.

In the invention, first to J numbered current sources flow current corresponding to a bias voltage from the standard current generating circuit (a standard voltage generating circuit). Then, the first current source is directly connected to the first switching element for current control. The second current source is directly connected to the second switching element for current control. Further, the J numbered (J is an integer equal to or more than two) current source is directly connected to the J numbered switching element for current control. The value of the current from the constant current circuit is set by the state of ON or OFF of first to J numbered switching elements for current control. This circuit can vary the value of the current from the constant current circuit with simple structure.

In the invention, the current control circuit may output first to J numbered current control signals to turn the first to J numbered switching elements for controlling current ON or OFF.

This structure can vary the value of the current from the constant current circuit by the state of ON or OFF of first to J numbered switching elements for current control.

In the invention, the first switching element for controlling current may be turned ON; and the current control circuit may output first to J numbered current control signals to turn the first to J numbered switching elements for controlling current ON or OFF.

This structure can flow the current from the constant current source. The current is an addition of the current flowing to the second to J numbered current sources to the standard current flowing to the first current source.

In the invention, the constant current circuit, which is located between the first power source and the node, may include the J+1 current source that flows the current flowing into the first to J numbered current sources.

This structure can install the J+1 current source between the first power source and the node instead of the first to J numbered current sources and the first to J numbered switching elements for current control. Further, the structure can prevent the device from the bad effects such as resistance and noise generated from switching elements for current control and the like, maintaining high transmission quality.

According to other aspects of the invention, the constant current circuit includes: a standard current generating circuit; first to J numbered current sources installed between the first power source and the node; a gate of a transistor providing the first to J numbered current sources; and first to J numbered switching elements for current control, which are installed between the output node of a bias voltage of the standard current generating circuit. The current control circuit may output first to J numbered current control signals to turn the first to J numbered switching elements for controlling current ON or OFF.

The structure can also prevent the device from the adverse effects such as resistance and noise generated from switching elements for current control and the like, maintaining high transmission quality.

In the invention, a differential signal transmitted via first and second signal lines constituting a differential pair, is a signal regulated by universal serial bus (USB) standard. The invention pertains to data transmission control device including a transceiver having any of the above-mentioned signal transmission circuits and a transmission controller to control data transmission. Further, the invention pertains to an electronic device including the above mentioned data transmission control device and a processing unit that controls the data transmission control device.

BRIEF DESCRIPTION OF THE DRAWINGS

The invention will be described with reference to the accompanying drawings, wherein like numbers reference like elements.

FIG. 2A and FIG. 2B show examples of waveforms of transmission control signals.

FIG. 4A and FIG. 4B show explanations of standards for output high-level voltage and end terminal resistances.

FIG. 6 shows the relationship among end terminal resistances, output high-level voltages, and current values.

DESCRIPTION OF EXEMPLARY EMBODIMENTS

Preferred embodiments of the present invention will now be described with reference to the accompanying drawings. Here, the embodiments described below do not unduly limit the scope of the invention and all elements explained in the embodiments are not always necessary factors as means of the invention.

1. Signal Transmission Circuit

Figure 1:
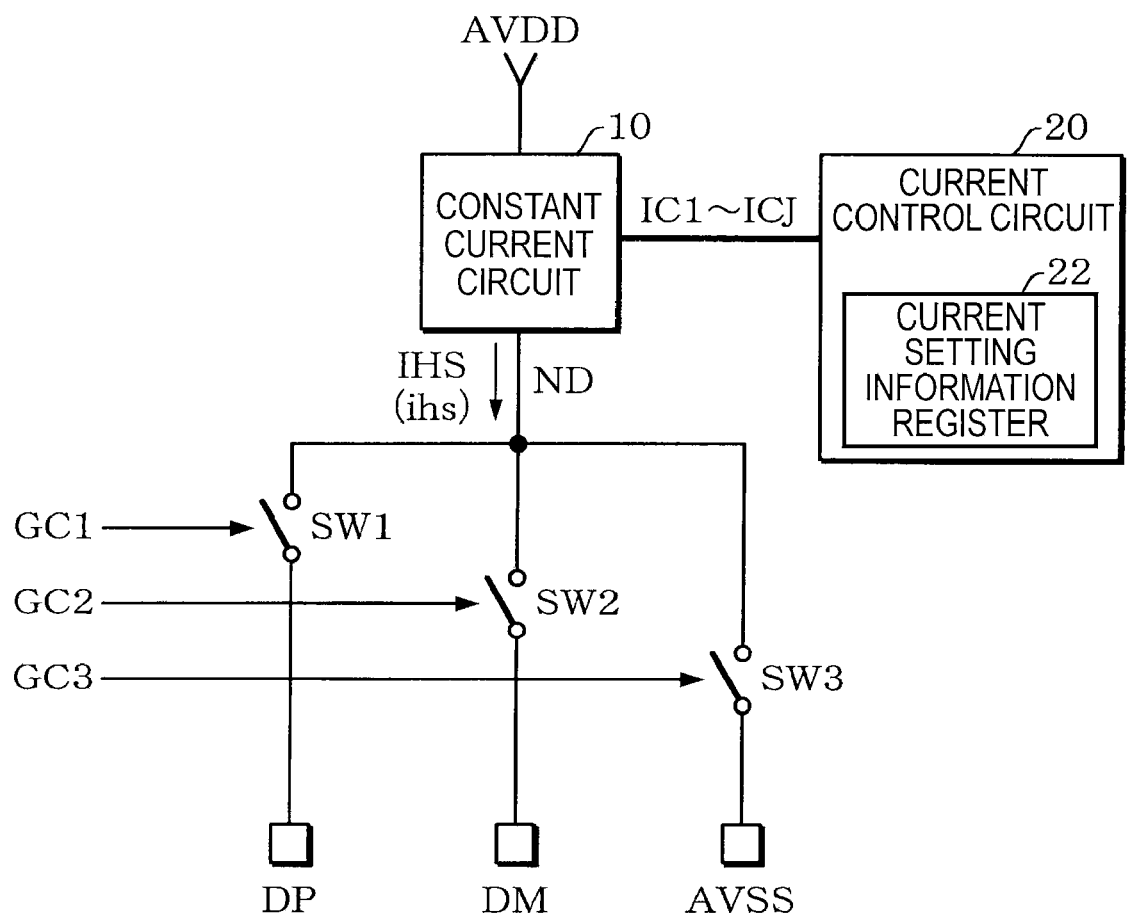
FIG. 1 shows an example of a signal transmission circuit of the embodiment.

FIG. 1 shows an example of a signal transmission circuit (a transmission driver and a current driver) of the embodiment. The signal transmission circuit comprises a constant current circuit 10, a current control circuit 20 and first to third switching elements SW1 to SW3.

The constant current circuit 10 (a current source and a current circuit) is installed between a power source AVDD (a first power source in a broad sense) and a node ND. The switching element SW1 is installed between the node ND and a plus side signal line DP (a first signal line in a broad sense) constituting a differential signal line. The switching element SW2 is installed between the node ND and a minus side signal line DM (a second signal line in a broad sense) constituting a differential signal line. The switching element SW3 is installed between the node ND and a power source AVSS (a second power source in a broad sense). The switching elements SW1 to SW3 are composed of transistors (CMOS transistors or N type transistors) and turned ON or OFF by transmission control signals GC1, GC2 and GC3.

A current control circuit 20 controls (sets) variable values of the current (the current flowing between AVDD and ND) flowing through the constant current circuit 10 and includes a current setting information register 22. More specifically, the current control circuit 20 outputs current control signals IC1 to ICJ to the constant control circuit 10. The voltage levels of the current control signals IC1 to ICJ are set based on setting information from the current setting information register 22 (setting value). The setting information is written to the current setting information register 22 by firmware (a processing unit or a CPU), for example. A constant current having a current value corresponding to the voltage levels of current control signals IC1 to ICJ flows through the constant current circuit 10 to the node ND. If the voltage level of current control signals IC1 to ICJ is a first set, for example, a constant current having the first current value flows. If the voltage level of current control signals IC1 to ICJ is a second set, a constant current having the second current value flows. If the voltage level of current control signals IC1 to ICJ is a Kth set, a constant current having the Kth current value flows.

The signal transmission circuit drives (current-drive) the signal line DP or DM via the switching element SW1 or SW2 with the current from the constant current circuit 10. More specifically, the signal line DP or DM is driven by turning switching elements SW1 to SW3 ON or OFF based on transmission control signals GC1 to GC3 from a transmission control circuit (not shown).

FIG. 2A shows examples of signal waves of transmission control signals GC1 to GC3. The signals GC1 and GC2 are non-overlapping signals in which one signal is active (high-level for example) when the other signal is non-active (low level for example), and vice versa. The signal GC3 becomes non-active during a transmission period, but active during non-transmission period.

If the signal GC1 becomes active, the switching element SW1 is turned ON, flowing the current from the constant current circuit 10 to the signal line DP via the switch SW1. On the other hand, if the signal GC2 becomes active, the switching element SW2 is turned ON, flowing the current from the constant current circuit 10 to the signal line DM via the switch SW2. Here, the signal lines DM and DP are connected to an end terminal resistance described hereafter. If the signal GC1 becomes active and the signal GC2 becomes non-active, these states generate a J state where the voltage of DP is 400 mV and the voltage of DM is 0V. Further, if the signal GC1 becomes non-active and the signal GC2 becomes active, these states generate a K state where the voltage of DP is 0V and the voltage of DM is 400 mV. Namely, making the USB bus state be the J state or the K state by controlling the signals GC1 and GC2 can transmit data via USB (packet transmission).

Further, as shown in FIG. 2A, if the signal GC3 becomes active during the period when no transmission (HS transmission) is occurring, the current from the constant current circuit 10 flows to the power source AVSS (the second power source) via the switching element SW3. Namely, the current from the constant current circuit 10 is discarded. Accordingly, making the current from the constant current circuit 10 flow via the switch SW3 except during transmission can stabilize the potential of the node ND. Further, at the time of starting transmission, the stabilized current from the constant current circuit 10 can instantaneously flow into the signal lines DP and DM via the switching elements SW1 and SW2, improving response of the signal transmission circuit.

Here, the value of the current IHS from the constant current circuit 10 is relatively large, such as 17.78 mA. Hence, if the current from the constant current circuit 10 flows to AVSS during the period when transmission is not occurring, power consumption of the signal transmission circuit becomes large.

Regarding this issue, according to FIG. 2B, the enable signal of the constant current circuit 10 (the signal which sets the current source to an enabled state) becomes active at a time indicated by C2, which is before a time indicated by C1, when a packet is transmitted on USB. Namely, the enable signal becomes active at the time (C2), which is before the time (C1) of starting to transmit a packet by the period of waiting transmission TS. This setting can perform an appropriate transmission by using the current from the constant current circuit during the period of transmitting a packet and prevent a wasteful current from flowing into AVSS during the entire period outside of transmission. Accordingly, this setting can reduce power consumption of a data transmission control device or an electronic device. Further, if the length of the transmission waiting time TS becomes sufficient, such as over 100 ns, for stabilizing the current from the constant current source 10 and the potential of the node ND, the stabilized current from the constant current circuit 10 can instantaneously flow into the signal lines DP and DM via the switches SW1 and SW2 at the time of starting transmission, maintaining high response of the signal transmission circuit.

In this case, it is preferable that a transaction layer (a transaction controller) control (generate and output) the enable signal of the constant current source 10. For example, and by way of comparison, a circuit of a packet layer (or a lower layer), such as a packet generation circuit, may control the enable signal. The circuit of the packet layer, however, does not recognize the transaction being performed in a bus. Hence, this comparative example cannot realize an intelligent control, such as changing timing of the enable signal according to the variety of transaction being executed.

On the other hand, if a circuit of the transaction layer (a transaction controller), which recognizes the transaction (timing for changing a transaction phase), controls the enable signal, the control corresponds to the transaction being performed in the bus, realizing an intelligent control such as changing timing for the enable signal according to the variety of transaction being executed. More specifically, if the transaction type is an IN transaction, it is possible to control the enable signal to be active during a period between the time of ending receipt of an IN token packet and the timing of starting transmission of a data packet. Otherwise, if the transaction type is an OUT transaction, it is possible to control the enable signal to be active during a period between the timing of ending receipt of a data packet and the timing of starting transmission of a handshake packet.

2. Control of Constant Current Value

Figure 3A:
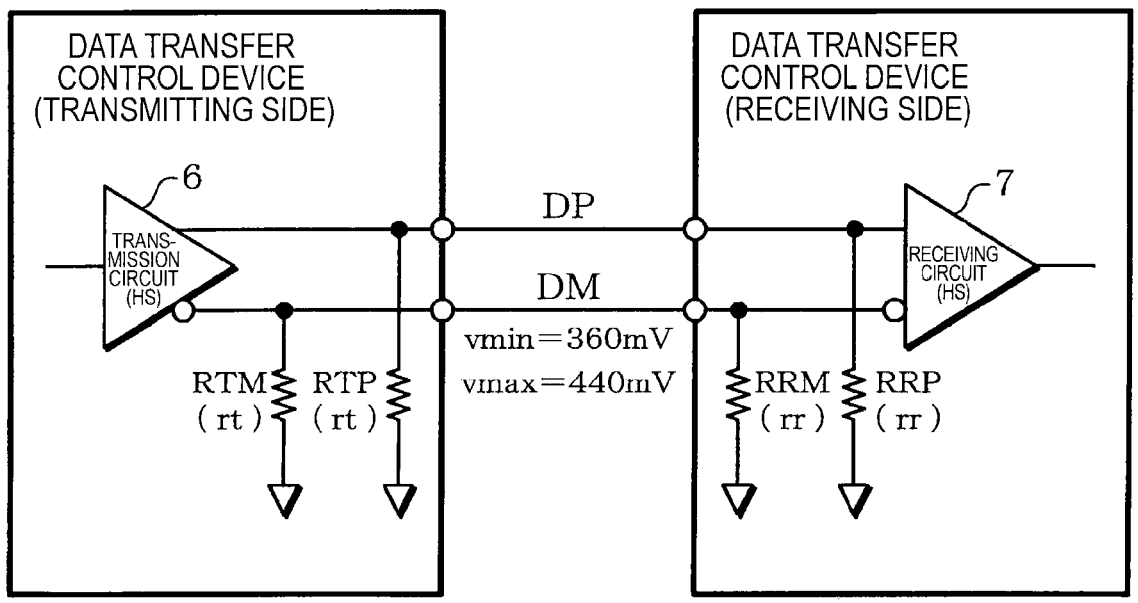
FIG. 3A and FIG. 3B show explanations of end terminal resistances.
Figure 3B:
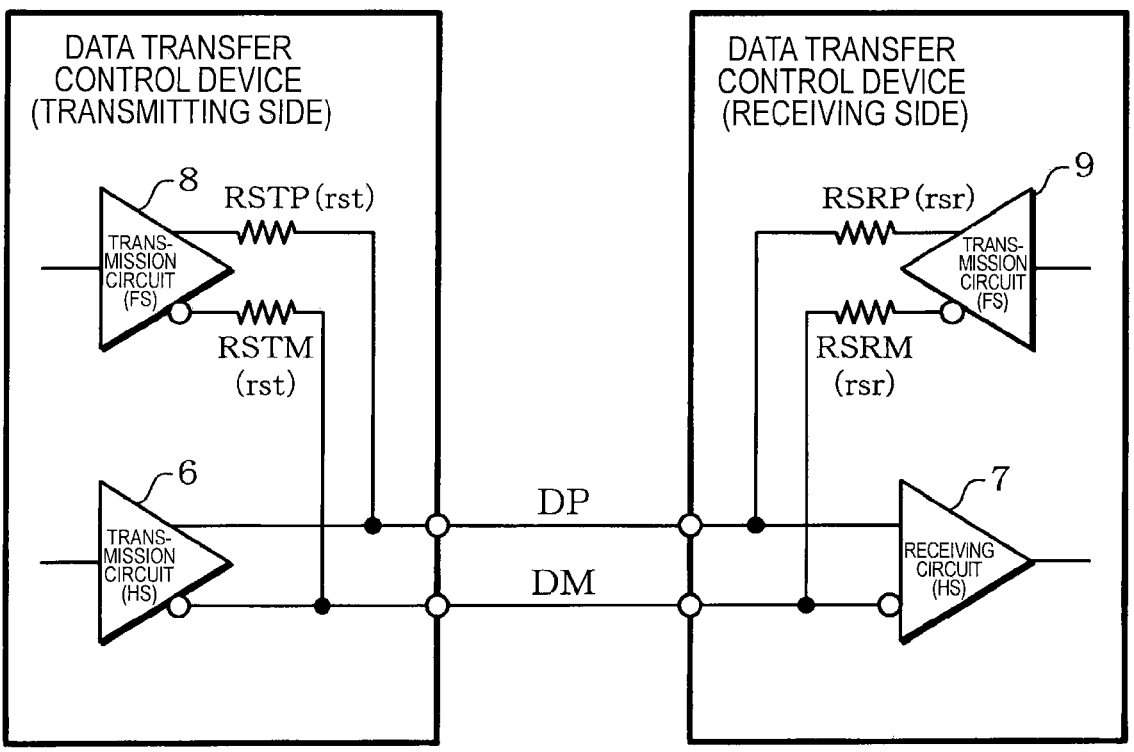

As shown in FIG. 3A, the signal lines DP and DM are connected to end terminal resistances RTP and RTM at a transmission side and end terminal resistances RRP and RRM at a receiving side. In FIG. 3A, the value of end terminal resistances RTP and RTM at a transmission side is expressed as rt and the value of end terminal resistances RRP and RRM at a receiving side is expressed as rr. Further, as shown in FIG. 3B, these end terminal resistances RTP, RTM, RRP and RRM comprise ON resistances of transistors constituting the signal transmission circuits 8 and 9 for FS (FS drivers). Resistors RSTP, RSTM, RSRP and RSRM (dumping resistances) are connected to outputs of the signal transmission circuits 8 and 9. Namely, if the signal transmission circuits 8 and 9 for FS drive "0", end terminal resistances RTP, RTM, RRP and RRM can be realized.

In FIG. 4A, the output high-level voltage VHSOH is normalized in USB 2.0. More specifically, the minimum value of VHSOH (vmin) is 360 mV and the maximum value (vmax) of it is 440 mV. Further, the value of the end terminal resistance reterm is normalized in USB 2.0. More specifically, the minimum value of rterm (rtl and rrl) is 40.5Ω and the maximum value (rth and rrh) of it is 49.5Ω.

Figure 5:
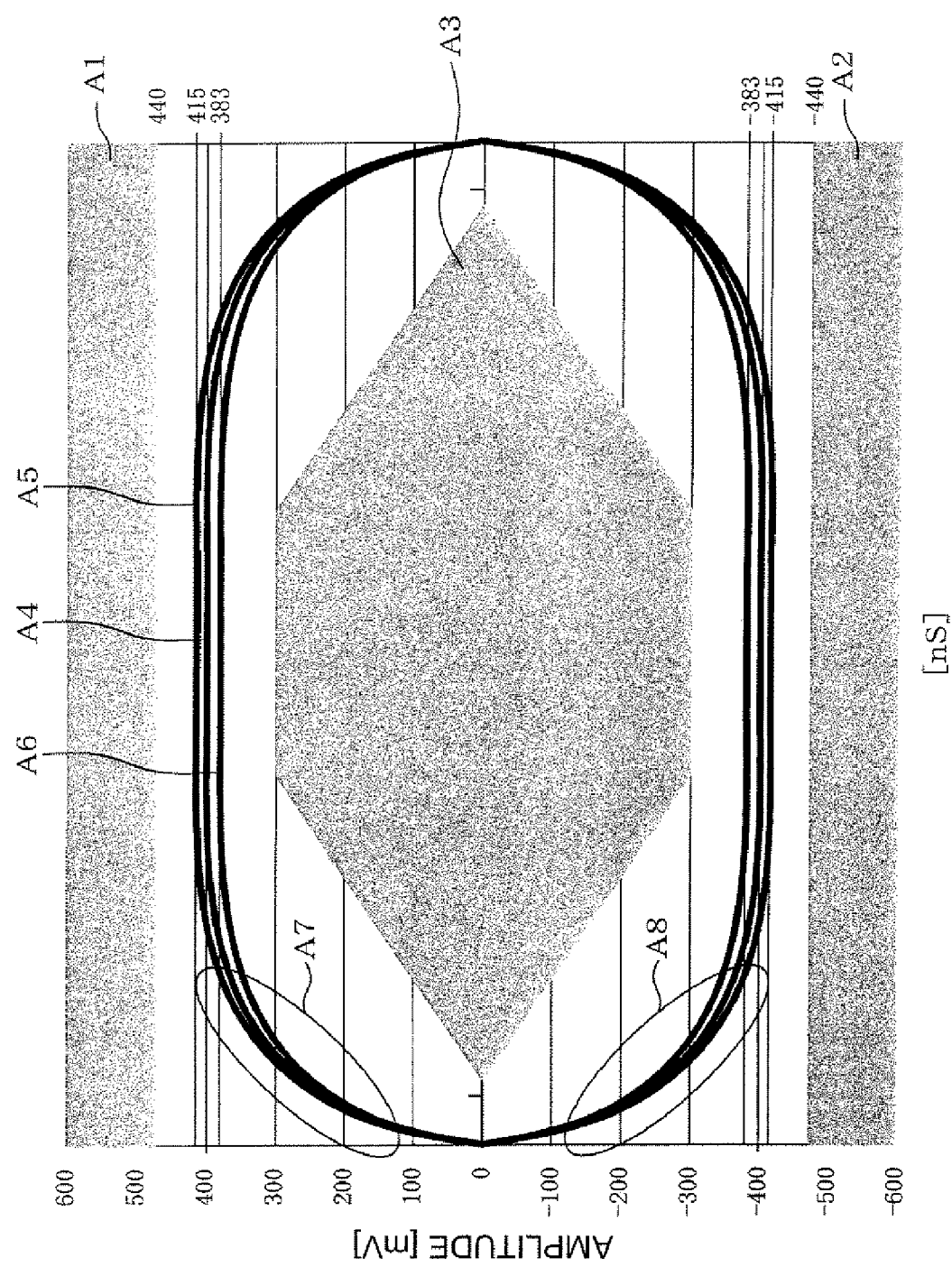
FIG. 5 shows an eye pattern.

For example, FIG. 5 shows an example of an eye pattern (differential signal characteristics) of USB. In FIG. 5, rectangular regions indicated by A1 and A2 and a hexagonal region indicated by A3 are inhibited regions defined in USB in which a signal transmission circuit or a transfer circuit must be designed so that the signal waves DP and DM do not enter this inhibited region. As shown in FIG. 5, if the voltage level of the signal lines DP and DM become more than 440 mV or less than 360 mV, the signal waves of DP and DM enter into the inhibited regions A1 and A2 and do not satisfy the USB standard.

The old signal transmission circuit of USB (USB 2.0) had the fixed value of the current flowing from the constant current circuit without controlling variable values. Namely, the constant current circuit flowed the fixed current, ihs=17.78 mA, if the end terminals of transmission side and receiving side are 45Ω. Setting a fixed value makes the voltage levels of DP and DM be 400 mV, which is shown as A4 in FIG. 5, making the signal waves of DP and DM not enter into the prohibited regions A1, A2 and A3.

However, there is a case when the distance between an IC terminal of data transmission control device having a signal transmission circuit and a USB receptacle of a circuit board is long. In such a case, VHSOH may not be 400 mV at the USB receptacle even if VHSOH is 400 mV. Further, there is a case when a sufficient signal amplitude cannot be obtained depending on wave deterioration (wave attenuation) on a transmission line or change of device characteristics. Further, in a case when a data transmission control device at a receiving side does not observe the USB standard, data may not be normally transmitted even if the wave signal VHSOH at a transmission side observes the USB standard.

Hence, according to the embodiment, the value ihs of the current IHS flowing from the constant current circuit 10 in FIG. 1 is set to be variable. Namely, the current value ihs is set to be one of various values based on the current control signals IC1 to ICJ from the current control circuit 20. For example, the value of the end terminals at a transmission side and a receiving side is assumed to be 45Ω. Based on this assumption, as shown in FIG. 4B, if the value of the current flowing from the constant current circuit 10 is ihs=16 mA, VHSOH becomes vmin=360 mV. If such value is ihs=19.56 mA, VHSOH becomes vmax=440 mV.

For example, it is preferable that the distance between an IC terminal of a data transmission control device and a USB receptacle of a circuit board be long and the output high-level voltage be large when the attenuation of the signal amplitude is large. Namely, in this case, the current value ihs from the constant current circuit should be large. This setting makes the waveform of the signals DP and DM become waveforms indicated as A5 in FIG. 5 and VHSOH be 400 mV at the receptacle of USB even if the signal amplitude is attenuated. Further, even in a case when the data transmission control device at the receiving side does not observe the USB standard and the prohibited region of A3 in FIG. 5 is large, data can be transmitted without error.

Further, if the distance between a transmission side and a receiving side is short, such as a USB memory for example, attenuation of signal amplitude at the time of transmission seems to be small. Namely, in this case, low power consumption is prioritized so that the current value ihs from the constant current circuit 10 should be small. This setting makes the signal waveforms of DP and DM be the waveform indicated as A6 in FIG. 5, where VHSOH may be smaller than 400 mV. However, if the transmission path of USB is short, such as a USB memory, there is almost no possibility that the signal waveforms of DP and DM will enter into the prohibited region of A3 at a receiving side. Then, when the current value ihs becomes small, the current of the signal transmission circuit becomes small, saving power consumption of a data transmission control device including a signal transmission circuit and an electronic device including a data transmission control device.

Namely, according to the embodiment, a value of a current flowing through a constant current circuit is set variable, whereas the conventional circuit is designed so that such value is constant. As an example of a method of varying the output high-level voltage VHSOH, controlling to vary only the values of end terminal resistances connected to DP and DM is considered.

This method, however, may not achieve impedance matching between the values of end terminal resistances of a transmission side and a receiving side, deteriorating transmission waveforms, if the value of end terminal resistance of a transmission side is varied.

In this regard, the embodiment controls varying the current value of the constant current circuit 10. Then it does not need to vary the value of an end terminal resistance. Hence, the circuit easily achieves impedance matching between transmission and receiving sides, maintaining preferable transmission waveforms.

Further, in the embodiment, an end user can adjust the current ihs of the constant current circuit 10 by a firmware and the like. Accordingly, the embodiment can perform intelligent control such as setting low power consumption mode by reducing the current value ihs when the transmission path is short, realizing an advanced signal transmission circuit never seen in the conventional circuit.

3. Setting Current Range

For example, a minimum value of an output high-level voltage of the signal transmission circuit is set to be vmin (360 mV), a maximum value of an output high-level voltage of the signal transmission circuit is vmax (440 mV), a value of the end terminal resistance of a transmitting side is rt, a value of the end terminal resistance of a receiving side is rr and a value of the current flowing from the constant current circuit 10 is ihs. In this case, the range of the current flowing from the constant current circuit 10 can satisfy the following relationship: $\{(rt+rr)/(rt*rr)\}*vmin \leq ihs \leq \{(rt+rr)/(rt*rr)\}*vmax$. In other words, the current control circuit 20 controls varying the value of the current that flows from the constant current circuit 10 within the range satisfying the above formula.

This setting makes the minimum value of the current ihs be ihsmin=$\{(rt+rr)/(rt*rr)\}*vmin$ and the maximum value be ihsmax=$\{(rt+rr)/(rt*rr)\}*vmax$. Accordingly, when the current of ihs=ihsmin flows, the output high-level voltage becomes VHSOH=vmin=360 mV. When the current of ihs=ihsmax flows, the output high-level voltage becomes VHSOH=vmax=440 mV. This setting can control varying the current ihs from the constant current circuit 10 while observing the USB standard.

Further, the minimum value among the values of the end terminal resistance of the receiving side is set to be rr1 (=40.5Ω) and the maximum value thereof is rrh (=49.5Ω). In this case, the range of the current flowing from the constant current circuit 10 may satisfy the following relationship: $\{(rt+rr1)/(rt*rr1)\}*vmin \leq ihs \leq \{(rt+rrh)/(rt*rrh)\}*vmax$.

FIG. 6 shows an example of the relationship among the end terminal resistance rt and rr, the output high-level voltage VHSOH and the current value ihs. As indicated by B1 in FIG. 6, when the end terminal resistances rt and rr are 45Ω (typical value) and VHSOH is 400 mV, ihs becomes 17.77778 mA.

Even if, however, the end terminal resistances rt at a transmission side are 45Ω (typical value), the end terminal resistances rr at a receiving side may be rr1=40.5Ω, which is a standard, as indicated by B2. In this case, when the current value ihs becomes less than 16.88889 mA, the output high-level voltage VHSOH becomes less than vmin=360 mV as indicated by B3, not observing the USB standard. Therefore, in order to avoid the case, it is desirable that the range of the current flowing from the constant current circuit 10 satisfies the following relationship: $\{(rt+rr1)/(rt*rr1)\}*vmin \leq ihs$ Further, even if the end terminal resistances rt at a transmission side are 45Ω (a typical value), the end terminal resistances rr at a receiving side may be rr1=49.5Ω which is a standard, as indicated by B4. In this case, when the current value ihs becomes larger than 18.66667 mA, the output high-level voltage VHSOH becomes larger than vmax=440 mV as indicated by B5, not observing the USB standard. Therefore, in order to avoid this, it is desirable that the range of the current flowing from the constant current circuit 10 satisfies the following relationship: $ihs \leq \{(rt+rrh)/(rt*rrh)\}*vmax$.

Accordingly, if the range of the current flowing from the constant current circuit 10 is set to be in the following range: $\{(rt+rr1)/(rt*rr1)\}*vmin \leq ihs \leq \{(rt+rrh)/(rt*rrh)\}*vmax$. The USB standard can be observed even if the end terminal resistances rr at a receiving side happens to be the minimum value rr1=40.5Ω or the maximum value rrh=49.5Ω. Further, if the current value ihs is varied within the above range, the power consumption of the signal transmission circuit can be reduced and the signal transmission handling with deterioration of transmission wave shape can be realized while observing the USB standard.

4. Control of End Terminal Resistance

Figure 7:
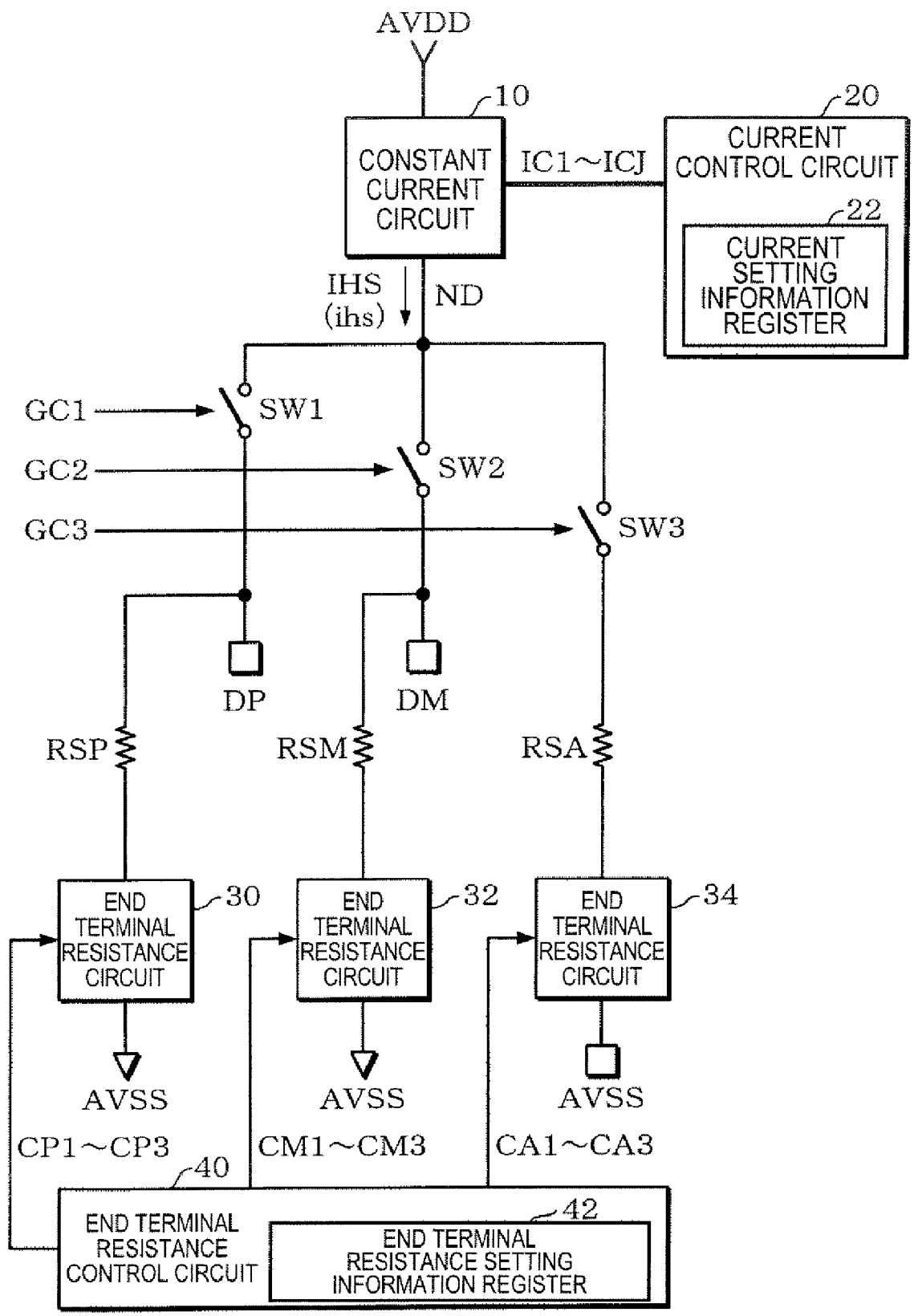
FIG. 7 shows a first modification of a signal transmission circuit of the embodiment.

FIG. 7 shows a first modification of the signal transmission circuit. In FIG. 7, the signal transmission circuit includes a first end terminal resistance circuit 30 to terminate the signal line DP (a first signal line) and a second end terminal resistance circuit 32 to terminate the signal line DM (a second signal line.) Further, the signal transmission circuit includes an end terminal resistance control circuit 40 varying a value of an end terminal of the end terminal resistance circuits 30 and 32.

Here, in FIG. 7, the signal transmission circuit also includes an end terminal resistance circuit 34 installed between the switching element SW3 and AVSS. Further, it includes a first fixed resistor RSP installed between the signal line DP and the end terminal resistance circuit 30 and a second fixed resistor RSM installed between the signal line DM and the end terminal resistance circuit 32. Further, it includes a third fixed resistor RSA installed between the switching element SW3 and the end terminal resistance circuit 34. The end terminal resistance circuit 34 and the fixed resistors RSP, RSM and RSA may be omitted.

Figure 8:
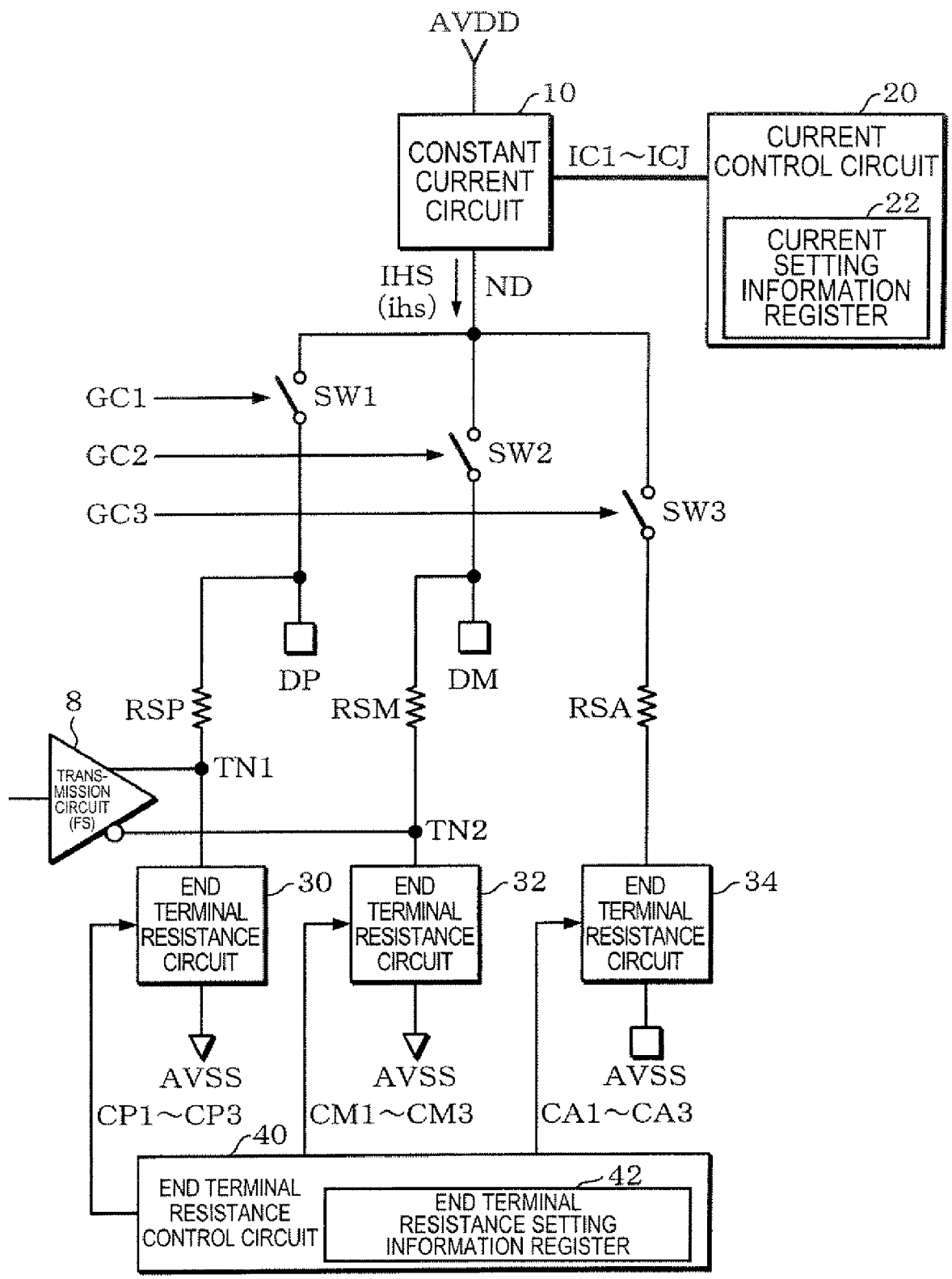
FIG. 8 is a diagram showing an output connection of a signal transmission circuit for FS.

As shown in FIG. 8, the output node (differential output) of the signal transmission circuit 8 for FS may be connected to nodes TN1 and TN2. This connection shown in FIG. 8 enables the fixed resistors RSP and RSM to be a dumping resistor for FS transmission when a transistor composing a resistor in the end terminal resistance circuits 30 and 32 is turned off during the FS mode. On the other hand, during the HS mode, setting the signal transmission circuit 8 for FS being disabled enables the resistor composed of the fixed resistor RSP and the end terminal resistance circuits 30 and the resistor composed of the fixed resistor RSM and the end terminal resistance circuits 30 to be used as an end terminal resistor for the HS mode. Hence, these settings can miniaturize the circuit since the fixed resistors RSP and RSM can be shared during both the FS and HS modes. Here, a resistor circuit varying a resistance value may be set between the output of the signal transmission circuit 8 for FS and signal lines DP and DM.

The end terminal resistance control circuit 40 varies resistance values of the end terminal resistance circuits 30, 32 and 34 and includes a register 42 that sets information regarding end terminal resistances. More specifically, the end terminal resistance control circuit 40 outputs resistance control signals CP (CP1 to CP3), CM (CM1 to CM3) and CA (CA1 to CA3) to the end terminal resistance circuits 30, 32 and 34. The voltage levels of resistance control signals CP, CM and CA are set based on setting information from the register 42. The information is written to the register 42 by firmware (a processing unit or a CPU), for example.

Figure 9:
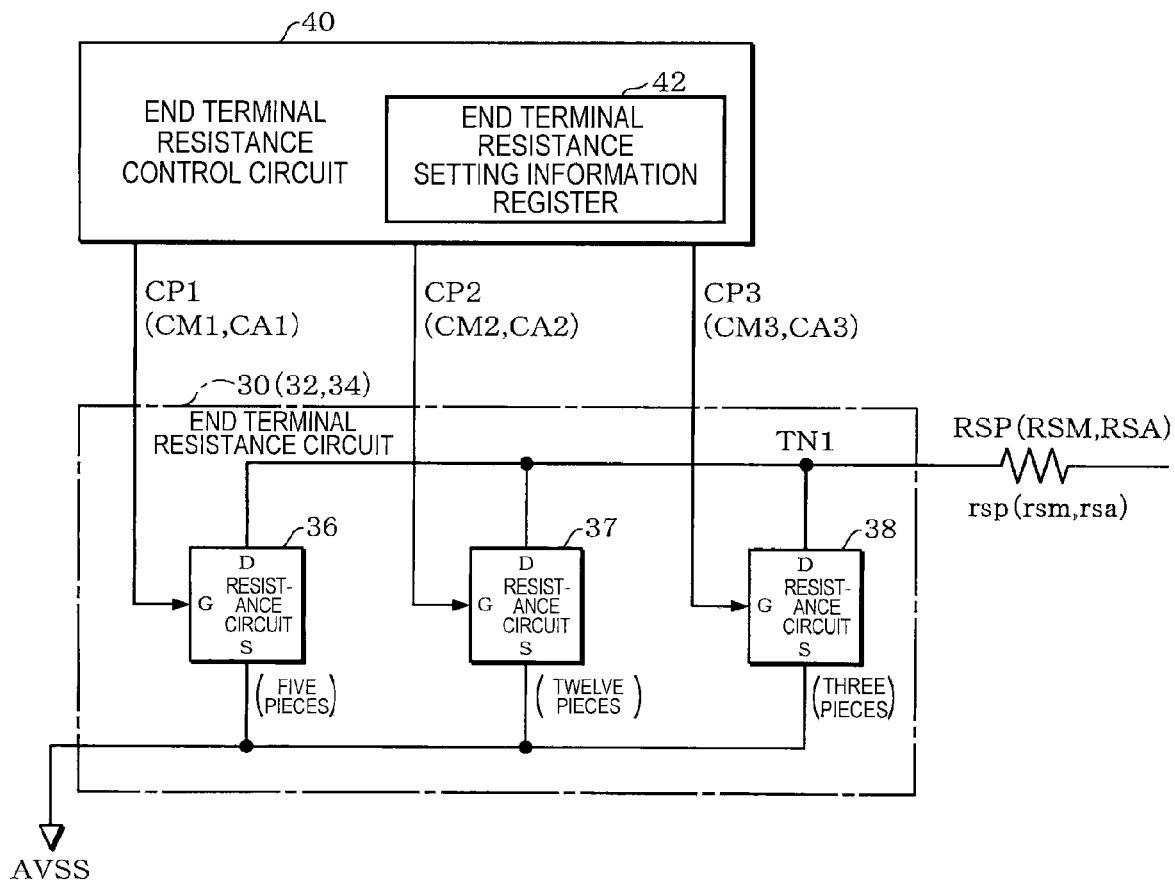
FIG. 9 shows an example of an end terminal resistance circuit.

FIG. 9 shows an example of circuitry for the end terminal resistance circuit 30. Here, the end terminal resistance circuits 32 and 34 have the same circuitry.

The end terminal resistance circuit 30 includes resistance circuits 36, 37 and 38. Each of these resistance circuits 36, 37 and 38 includes a plurality of transistors such as NMOS transistors. Each of these resistance circuits 36, 37 and 38 includes five, twelve or three transistors arranged in parallel to each other, for example. The drains of these transistors are connected to a node TN1 and the sources thereof are connected to a power source AVSS. Resistance control signals CP1, CP2 and CP3 from the end terminal resistance control circuit 40 are input to the gates of the transistors comprising resistance circuits 36, 37 and 38. Then, if resistance control signals CP1, CP2 and CP3 become active, transistors comprising resistance circuits 36, 37 and 38 are turned on, making on resistance values thereof be the resistance values of resistance circuits 36, 37 and 38 (end terminal resistance values.)

If all resistance control signals CP1, CP2 and CP3 become active, all twenty (=five+twelve+three) transistors connected in parallel with each other are turned on, making the parallel resistance value composed of on resistance values thereof be 2.4Ω, for example. The end terminal resistance value becomes 41.4 Ωbecause of the fixed resistance value rsp=39Ω of RSP. If resistance control signals CP1 and CP3 become active and the resistance control signal CP2 becomes non-active, eight (=five+three) transistors connected in parallel and comprise resistance control circuit 36 and 38 are turned on, making the parallel resistance value composed of on resistance values thereof be 6.0Ω, for example. Hence, the end terminal resistance value becomes 45Ω=(39+6.0) Ω.

If the resistance control signal CP1 becomes active and the resistance control signals CP2 and CP3 become non-active, five transistors connected in parallel and comprise the resistance control circuit 36 are turned on, making the parallel resistance value composed of on resistance values thereof be 9.6Ω, for example. Hence, the end terminal resistance value becomes 48.6Ω=(39+9.6) Ω.

In the first modification described above, the end terminal resistance values of DP and DM can be varied. These circuitries can not only control the value of the current of the constant current circuit 10, but adjust output high-level voltages indicated as A4, A5 and A6 in FIG. 5 by controlling the end terminal resistance values. Further, even if the end terminal resistance value at the receiving side is not impedance-matched with that at the transmission side, it is possible to impedance-match them together by changing the end terminal resistance value at the transmission side.

If the end terminal resistance value at the receiving side is 40.5Ω indicated as B6 in FIG. 6 for example, the end terminal resistance value at the transmission side is changed to 40.5Ω indicated as B7 by end terminal resistance circuits 30 and 32 for example. This change can impedance-match them together. In this case, if the current value of the constant current circuit 10 is set to be over 17.77778 mA indicated as B8 by controlling the current control circuit 20, the output high-level voltage becomes more than 360 mV, observing the USB standard.

If the end terminal resistance value at the receiving side is 49.5Ω indicated as B9 in FIG. 6 for example, the end terminal resistance value at the transmission side is changed to 49.5Ω indicated as B10 by end terminal resistance circuits 30 and 32 for example. This change can impedance-match them together. In this case, if the current value of the constant current circuit 10 is set to be under 17.77778 mA indicated as B11 by controlling the current control circuit 20, the output high-level voltage becomes less than 440 mV, observing the USB standard.

As described above, combining the control of the current value of the constant current circuit 10 with the control of end terminal resistance values of the end terminal resistance circuits 30 and 32 can realize a new adjusting method which could not be attained in the old method.

5. Slew Rate Adjustment

Figure 10:
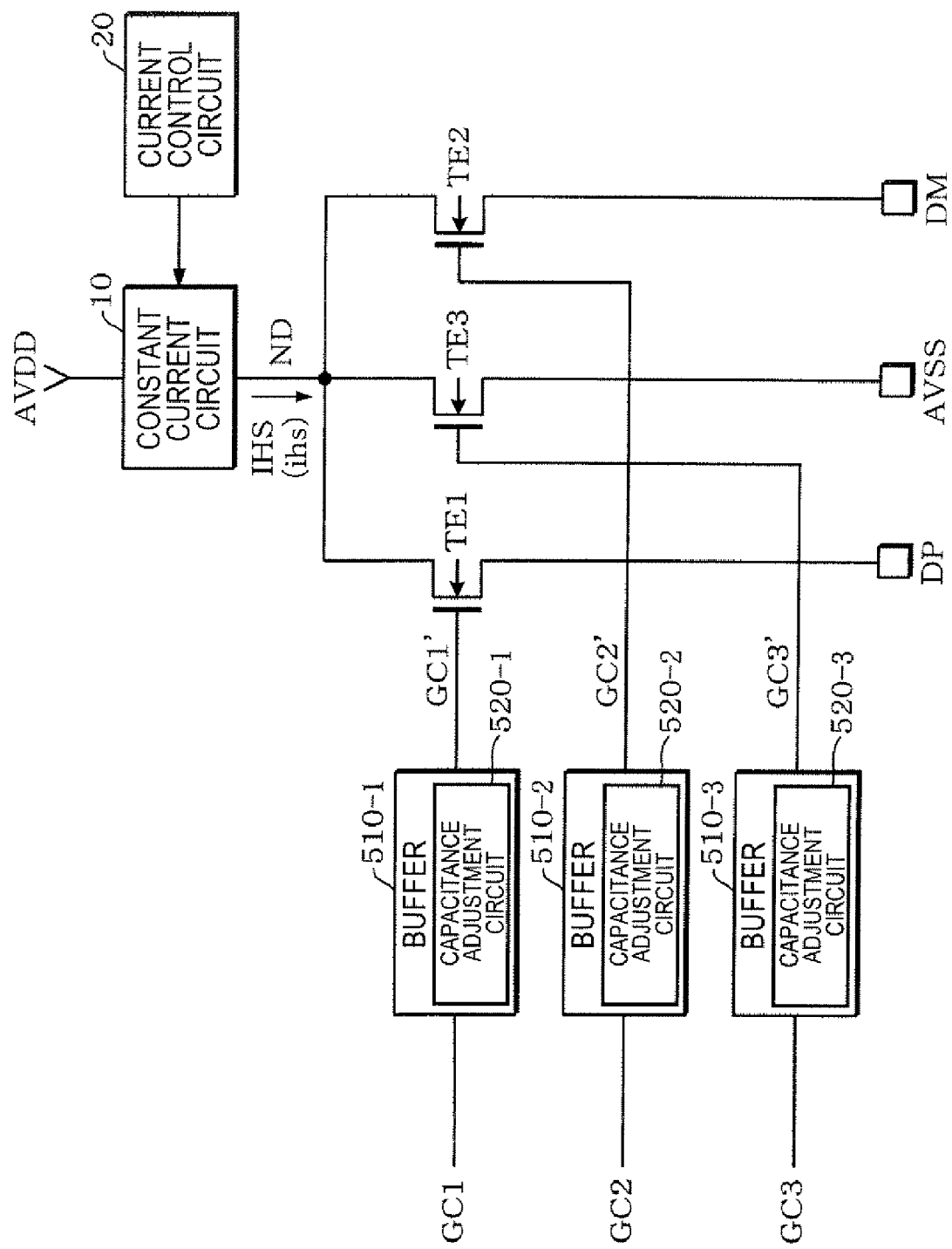
FIG. 10 shows a second modification of a signal transmission circuit of the embodiment.

FIG. 10 shows a second modification of the embodiment. In the circuit of FIG. 10, buffer circuits 510-1, 510-2 and 510-3 are added. In this circuitry of FIG. 10, switching elements SW1, SW2 and SW3 shown in FIG. 1 are composed of transistors TE1, TE2 and TE3.

Buffer circuits 510-1, 510-2 and 510-3 receive transmission control signals GC1, GC2 and GC3 and output transmission control signals GC1', GC2' and GC3' to the gates of transistors TE1, TE2 and TE3. The transmission control signals GC1 and GC2 are non-overlapped signals in which if one signal is active, the other signal is non-active, and vice versa.

Buffer circuits 510-1, 510-2 and 510-3 include capacitance adjustment circuits 520-1, 520-2 and 520-3 respectively. Installing these capacitance adjustment circuits 520-1, 520-2 and 520-3 and adjusting capacitances thereby can adjust a waveform of an output signal from the signal transmission circuit for HS to an arbitrary waveform. Namely, adjusting the slew rate for the signal transmission circuit is capable of adjusting eye pattern. For example, these circuits can adjust the rising slew rate of the signals DP and DM indicated as A7 in FIG. 5 and the falling slew rate of signals DP and DM indicated as A8 in FIG. 5. This adjustment can select the optimum slew rate (potential gradient) in response to a transmission path and a substrate. Accordingly, data can be accurately transmitted by using differential signals, even if the data transmission control device (an electronic device) connected via USB at the other side does not observe the USB standard.

Figure 11:
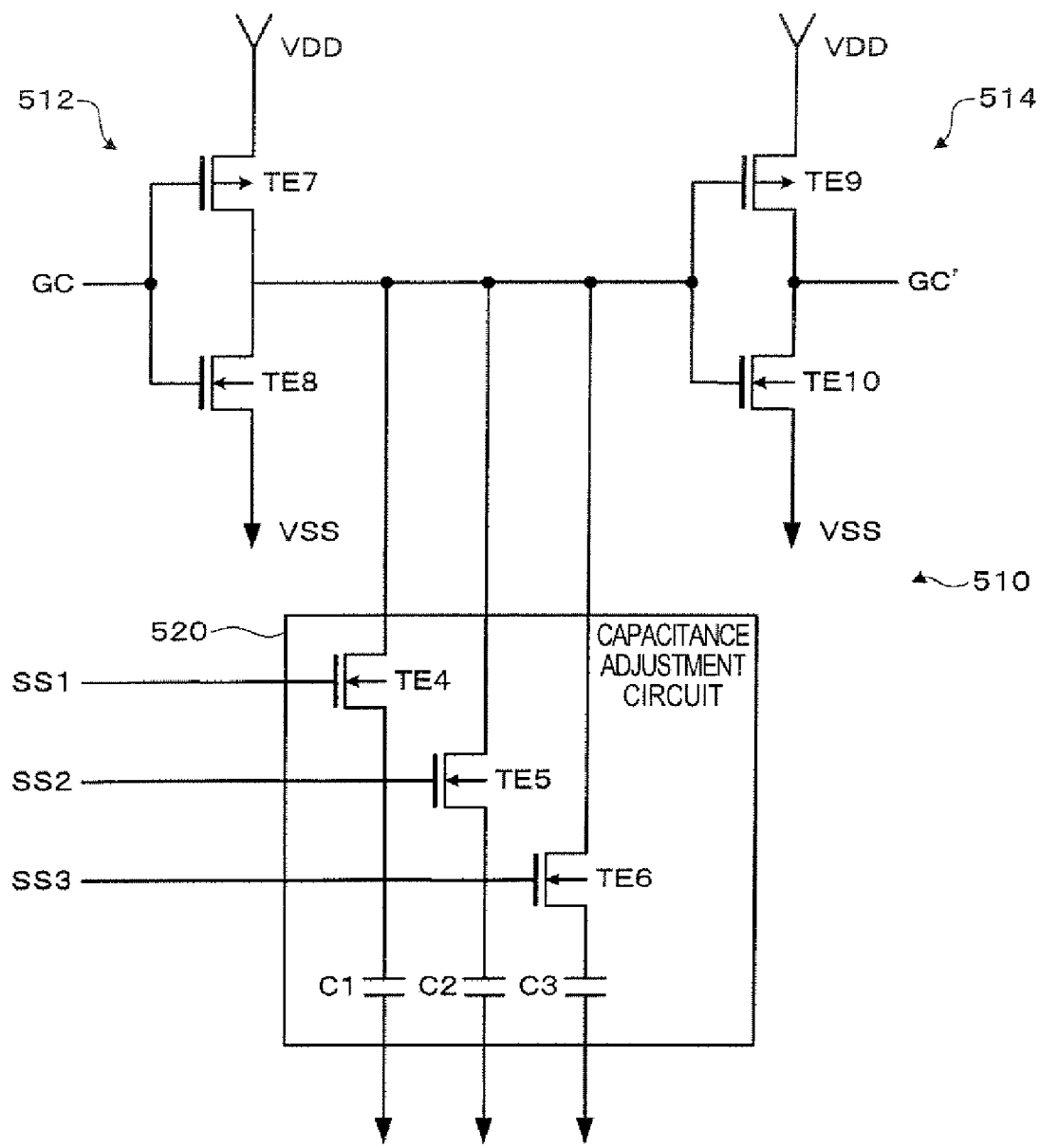
FIG. 11 shows an example of a buffer circuit.

FIG. 11 shows examples of a buffer circuit 510 (510-1, 510-2 and 510-3) and a capacitance adjustment circuits 520 (520-1, 520-2 and 520-3). The buffer circuit 510 includes a first inverter 512 and a second inverter 514 of which input node is coupled to the output node of the first inverter 512. The output node of the inverter 512 is coupled to the capacitance adjustment circuits 520.

The capacitance adjustment circuit 520 includes transistors TE4, TE5 and TE6 (at least one switching element for capacitance adjustment in broader meaning), which are turned on and/or off by the capacitance adjustment signals SS1, SS2 and SS3, and capacitance elements C1, C2 and C3 (at least one capacitance element in broader meaning.) The ends of capacitance elements C1, C2 and C3 are coupled to the other ends (sources) of transistors TE4, TE5 and TE6 (switching elements for adjusting capacitance) and the other ends of capacitance elements C1, C2 and C3 are coupled to a second power source AVSS.

Setting the levels of signals SS1, SS2 and SS3 for capacitance to various values can create arbitrary values of wiring capacitance at the output node of the inverter 512 (the input node of the inverter 514). This setting can arbitrarily adjust the slew rate of output from the signal transmission circuit for HS. A gate capacitance of a MOS transistor or a capacitance installed between first and second polycrystalline wirings may be used as capacitance elements C1, C2 and C3.

The second modification shown in FIG. 10 can adjust not only the output high-level voltage VHSOH, but also a slew rate. Accordingly, the modification is capable of setting signal waveforms of DP and SM to various waveforms, which are optimum for a transmission path, easily observing the USB standard regarding eye patterns shown in FIG. 5.

6. Constant Current Circuit

1) First Example

Figure 12:
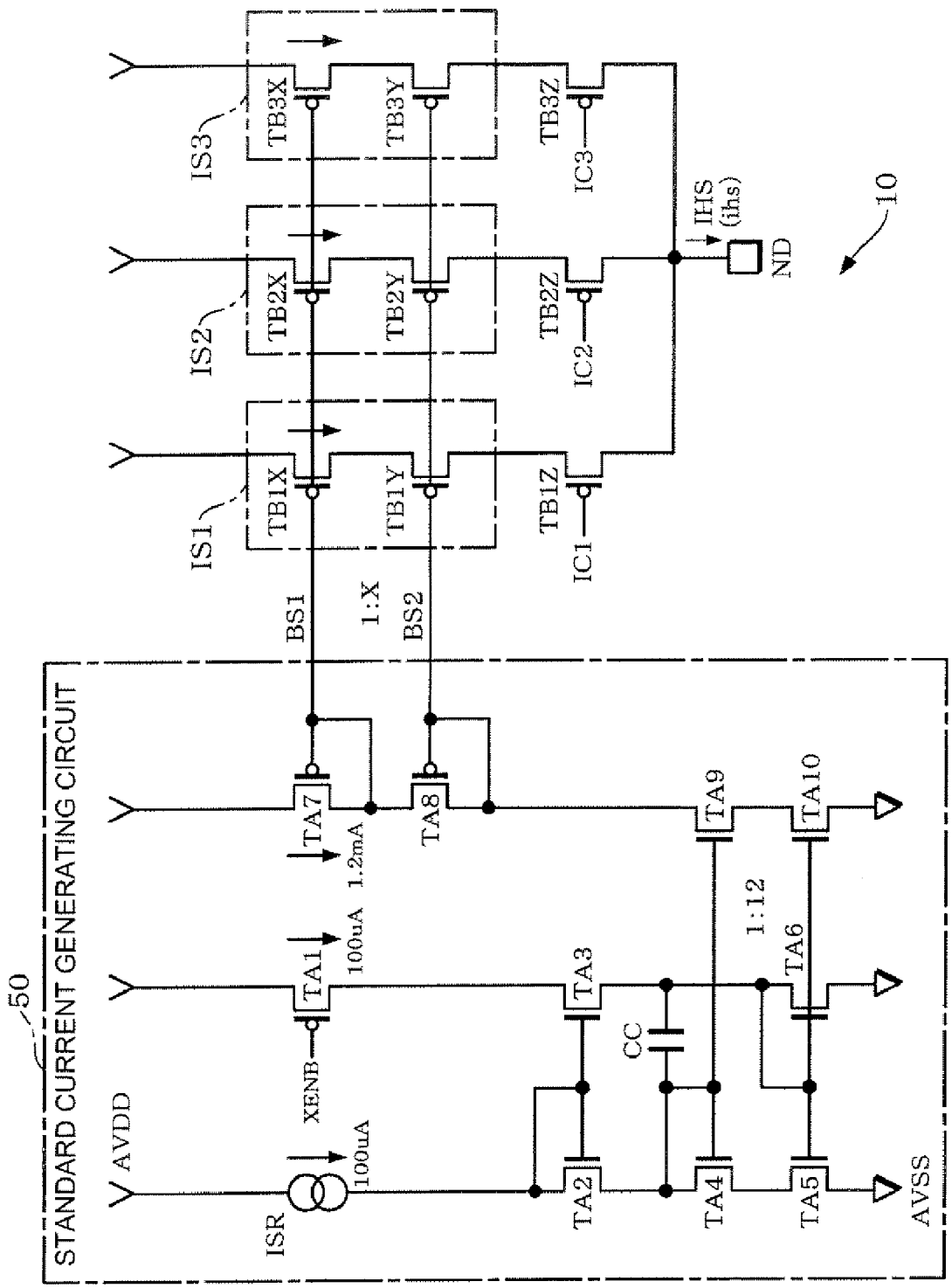
FIG. 12 shows a first example of a constant current circuit.

FIG. 12 shows a first example of the constant current circuit 10. As shown in FIG. 12, the constant current circuit 10 includes a standard current generating circuit 50 (a bias circuit), current sources IS1, IS2 and IS3 (first to J numbered current sources in broader sense) that flow currents based on bias voltages BS1 and BS2 from the standard current generating circuit 50. Further, the circuit includes transistors TB1Z, TB2Z and TB3Z (first to N numbered switching elements for controlling a current in a broader sense), which are coupled to current sources IS1, IS2 and IS3 in series, respectively.

The standard current generating circuit 50 includes a standard current source ISR and a transistor TA1. An enable signal XENB is input to the gate of transistor TA1. The circuit 50 further includes transistors TA2 and TA3 of which the gates are commonly connected to each other, transistors TA4 and TA9 of which the gates are commonly connected to each other and transistors TA5, TA6 and TA10 of which gates are commonly connected to each other. The circuit 50 further includes transistors TA7 and TA8, which are connected to transistors TA9 and TA10 in series.

The current, 100 µA, flowing to the standard current generating circuit 50 also flows through transistors TA1, TA2 and TA3 as a current mirror function. Then the current, 1.2 mA, which is twelve times greater than 100 µA, flows through transistors TA7, TA8, TA9 and TA10. Transistors TA7 and TA8 generate and output bias voltages BS1 and BS2 due to the current, 1.2 mA, flowing to them.

The current sources IS1, IS2 and IS3 include transistors TB1X and TB1Y connected in series, transistors TB2X and TB2Y connected in series, and transistors TB3X and TB3Y connected in series, respectively. The bias voltage BS1 is input to the gates of transistors TB1X, TB2X and TB3X, and the bias voltage BS2 is input to the gates of transistors TB1X, TB2X, and TB3X. The current control signals IC1, IC2 and IC3 are input to gates of current control transitions TB1Z, TB2Z and TB3Z.

For example, the value of the current flowing to the transistors TA7 and TA8 is ib=1.2 mA (the standard current unit) and the values of the currents flowing to the current sources IS1, IS2 and IS3 are ibx14, ibx15 and ibx16 respectively. Then, if the current control signals IC1 become active and only the transistor TB1Z is turned on, a current of ihs=ibx14=16.8 mA flows into the node ND. Then, if the current control signal IC2 becomes active and only the transistor TB2Z is turned on, a current of ihs=ibx14=18.0 mA flows into the node ND. Further, if the current control signal IC3 becomes active and only the transistor TB3Z is turned on, a current of ihs=ibx14=19.2 mA flows into the node ND. Accordingly, the current value ihs flowing to the node ND from the constant current circuit 10 can be changed to 16.8 mA, 18.0 mA and 19.2 mA by using the current control signals IC1, IC2 and IC3.

2) Second Example

Figure 13:
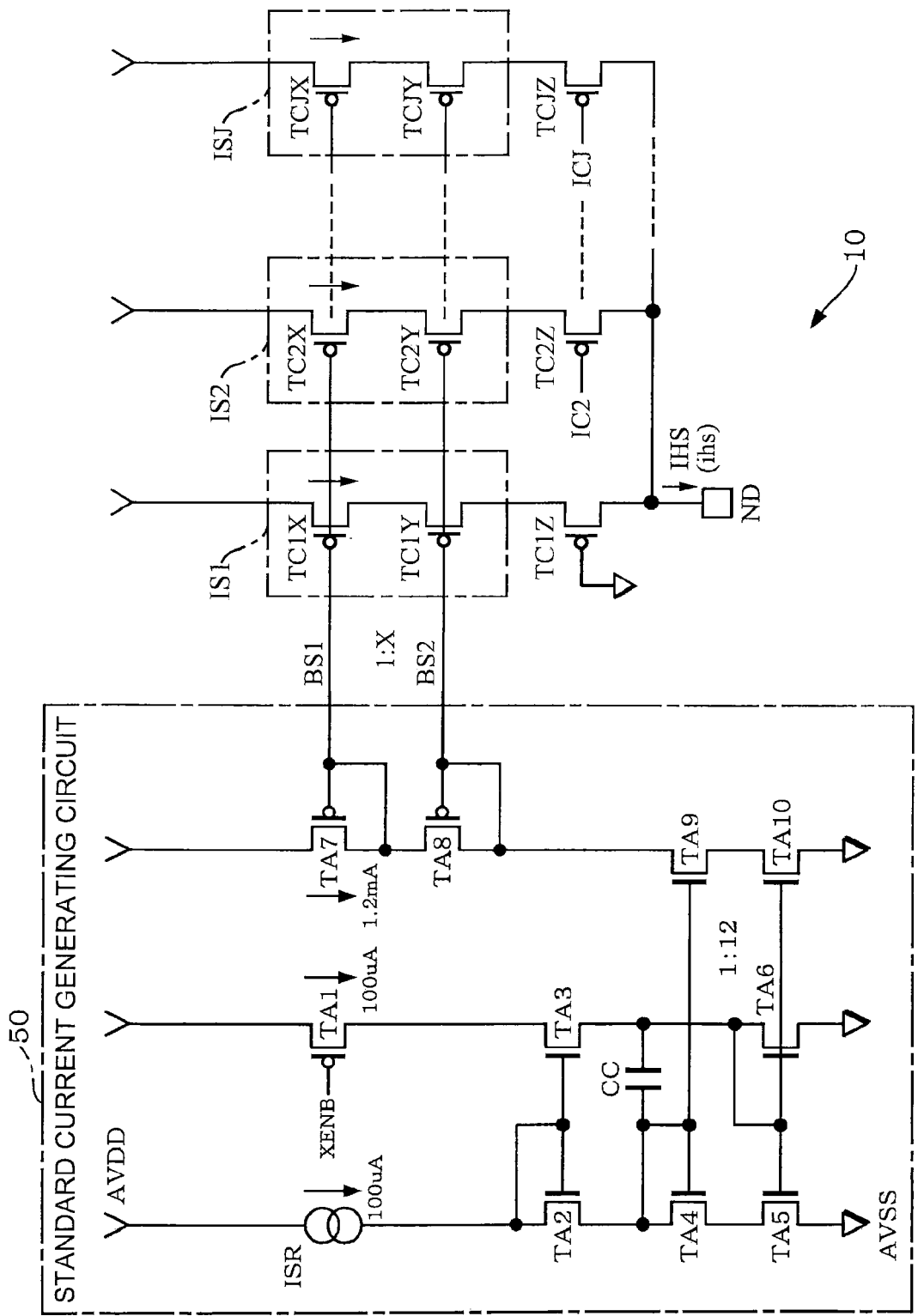
FIG. 13 shows a second example of the constant current circuit.

FIG. 13 shows a second example of the constant current circuit 10. In FIG. 13, the gate of a transistor TC1Z (a first transistor for controlling current) is connected to AVSS and turned on. A current control circuit 20 outputs current control signals IC2 to ICJ (a second to J numbered current control signals) to turn transistors TC2Z, TC3Z to TCJZ (a second current control switching elements to J numbered current control switching elements). In FIG. 13, the current ibx12 flows through the current source IS1 and the current ib flows through the current sources IS2 and IS3 for example. Then, if all the current control signals IC2 to ICJ become active, a current of ihs=ibx12=14.4 mA flows to the node ND. Further, if only the current control signal IC2 is active, the current is ihs=ibx12+ib=15.6 mA. If the current control signal IC2+IC3 are active, the current is ihs=ibx12+ibx2=16.8 mA. Then, if all the current control signals IC2 to ICJ become active and J=5, the current, ihs=ibx12+ibx5=20.4 mA flows to the node ND. Accordingly, the current value ihs flowing to the node ND from the constant current circuit 10 can be changed to 15.6 mA, 16.8 mA, 18.0 mA, 19.2 mA and 20.4 mA.

3) Third Example

Figure 14:
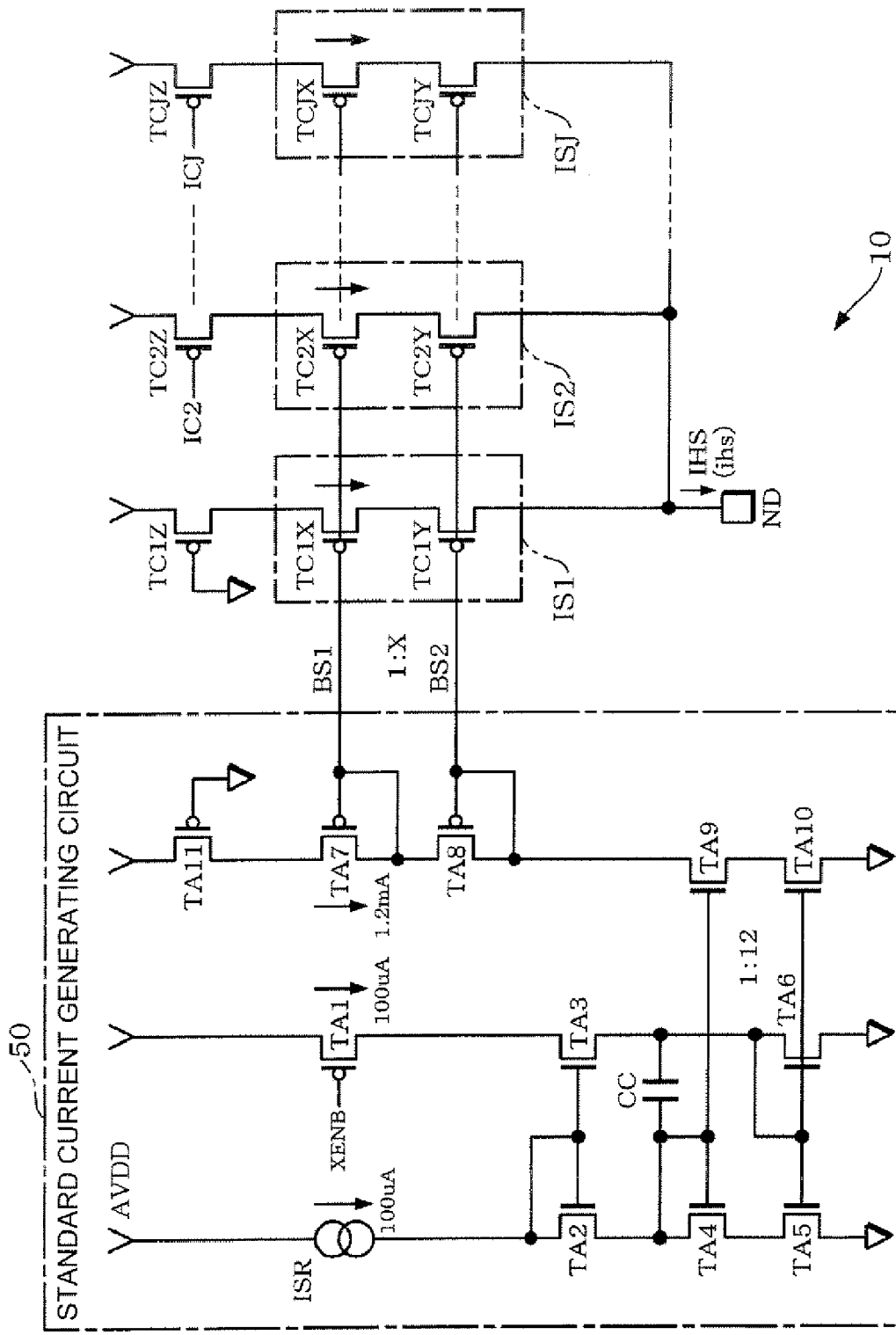
FIG. 14 shows a third example of the constant current circuit.

FIG. 14 shows a third example of the constant current circuit 10. In FIG. 13, the current control transistors TC1Z to TCJZ are installed between the current sources IS1 to ISJ and the node ND. On the other hand, in FIG. 14, the current control transistors TC1Z to TCJZ are installed between the current sources IS1 to ISJ and the power source AVDD. Here, in FIG. 14, the current control transistors TB1Z to TB3Z may be installed between the current sources IS1 to IS3 and the power source AVDD.

4) Fourth Example

Figure 15:
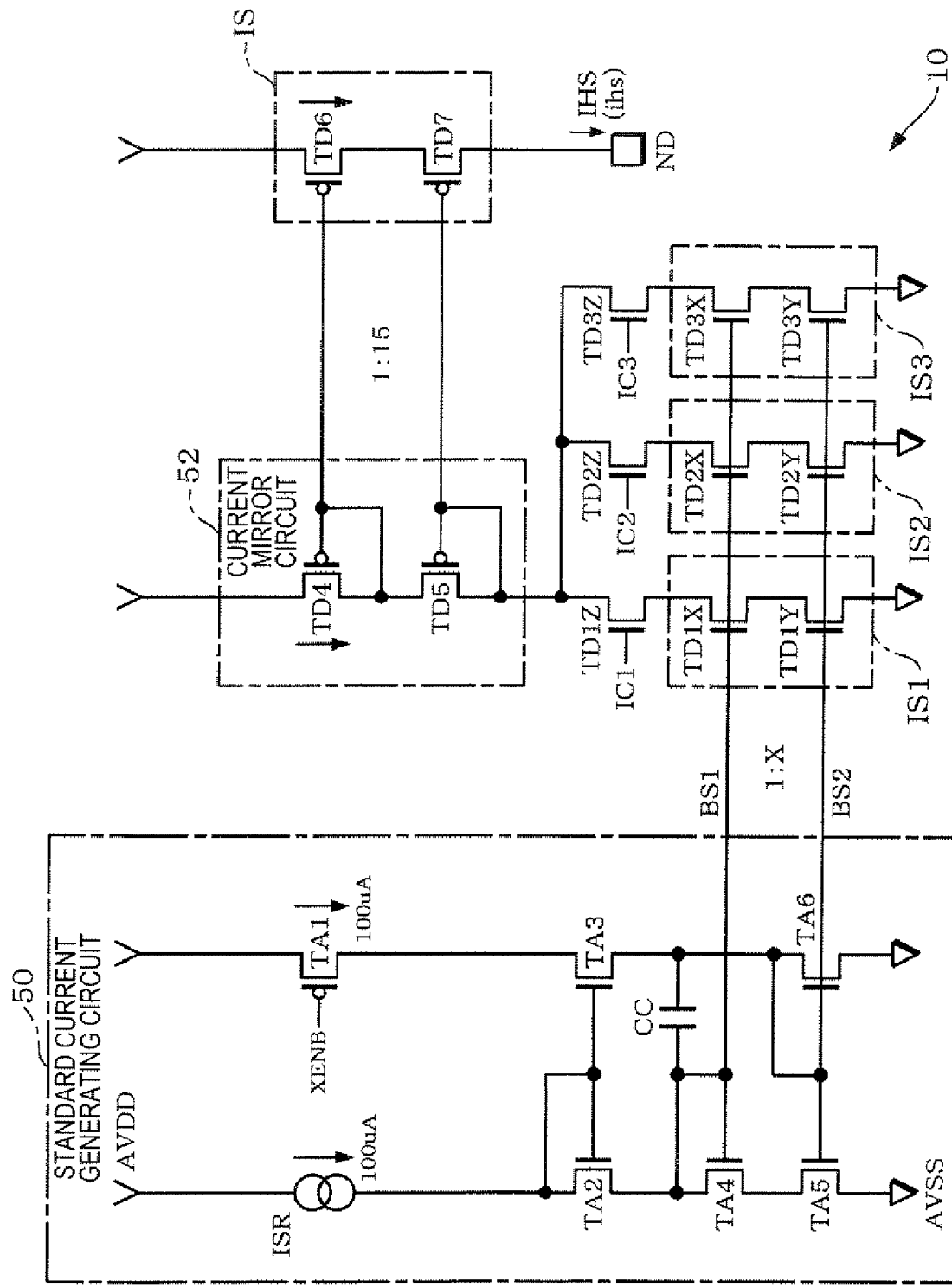
FIG. 15 shows a fourth example of the constant current circuit.

FIG. 15 shows a fourth example of the constant current circuit 10. In FIG. 15, the constant current circuit 10, which is located between the first power source AVDD and the node ND, includes the current source IS (the J+1 current source) that sources a current based on the total current flowing into the current sources IS1 to IS3 (the first to J numbered current sources.)

More specifically, in FIG. 15, the current sources IS1 to IS3 include N type transistors, while in FIG. 12, the current sources IS1 to IS3 include P type transistors. The current control transistors TD1Z, TD2Z and TD3Z also include N type transistors in FIG. 15. The current flowing to the current sources IS1 to IS3 is multiplied by fifteen times, for example, via a current mirror circuit 52, and flows through the current source IS thereafter.

For example, the value of the current flowing to the transistor TA1 is ib=100 μA (the standard current unit) and the values of the currents flowing to the current sources IS1, IS2 and IS3 are ibx11, ibx12 and ibx13 respectively. Then, if the current control signals IC1, IC2 and IC3 become active, the currents, 1.1 mA, 1.2 mA and 1.3 mA flow through transistors TD4 and TD5. Then these currents are multiplied by fifteen times via the current mirror circuit 52, and become 16.5 mA, 18.0 mA and 19.5 mA, flowing through the current source IS. Accordingly, the current value ihs flowing from the constant current circuit 10 can be changed to 16.5 mA, 18.0 mA and 19.5 mA by using the current control signals IC1, IC2 and IC3.

5) Fifth Example

Figure 16:
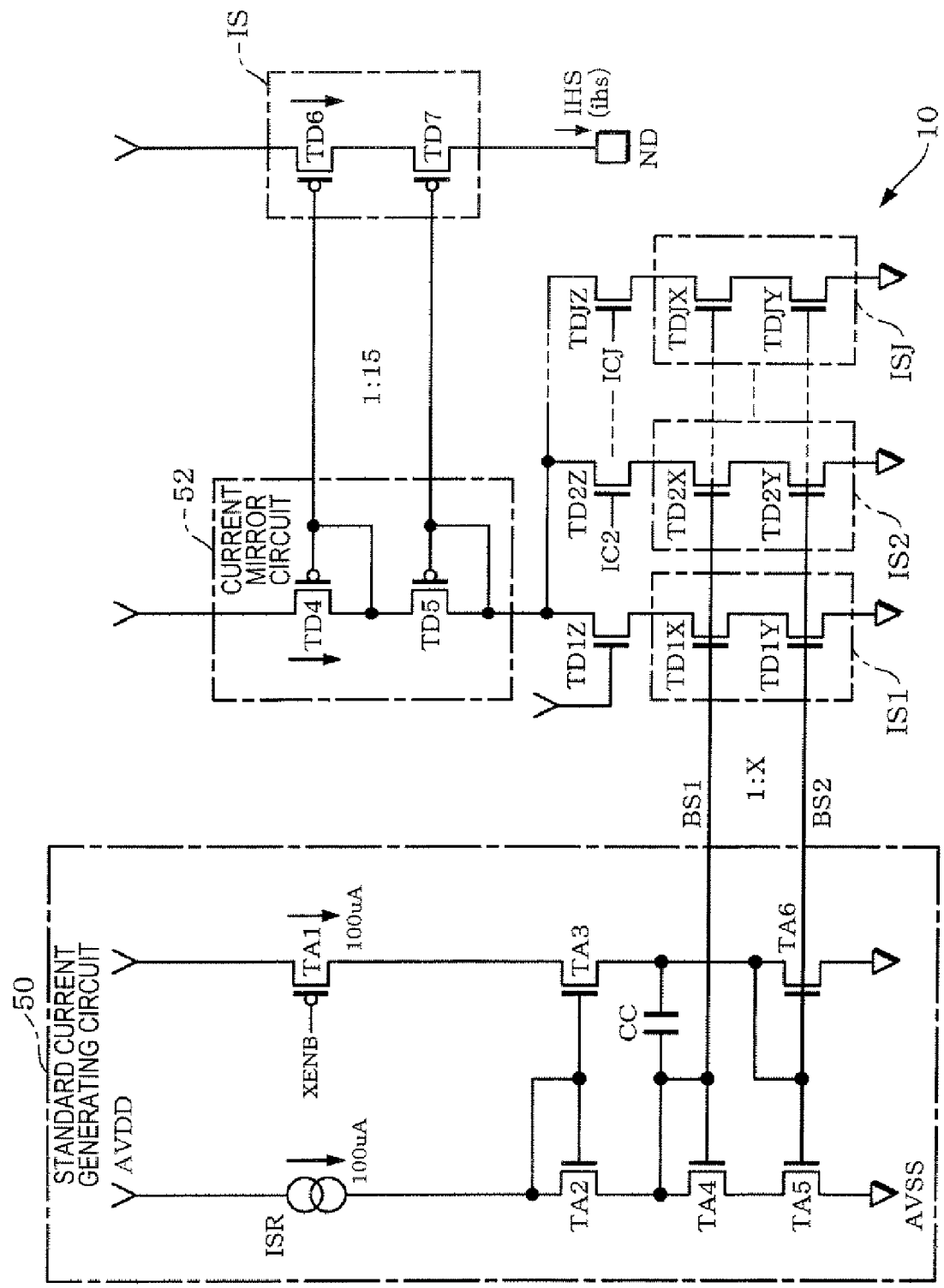
FIG. 16 shows a fifth example of the constant current circuit.

FIG. 16 shows a fifth example of the constant current circuit 10. In FIG. 16, the gate of a transistor TC1Z is connected to AVDD and turned on. In FIG. 15, the current ibx10 flows to the current source IS1 and the current ib flows to the current sources IS2 to ISJ for example. Therefore, if all current control signals IC2 to ICJ become non-active, the current 1.0 mA flows to the transistors TD4 and TD5 and multiplied by fifteen times via the current mirror circuit 52, becoming ihs=15.0 mA and flowing through the current source IS. Similarly, if only the current control signal IC2 is active, the current ihs=15+1.5=16.5 mA flows. If the current control signals IC2+IC3 are active, the current ihs=15+1.5×2=18.0 mA flows. Further, if all the current control signals IC2 to ICJ become active and J=4, the current, ihs=15+1.5×4=21.0 mA flows. Accordingly, the current value ihs from the constant current circuit 10 can be changed to 15.0 mA, 16.5 mA, 19.5 mA and 21.0 mA.

The fourth and fifth examples in FIG. 15 and FIG. 16 attain more stable operation compared to examples in FIG. 12 to FIG. 14 since the charged capacitance of the node ND becomes constant. Further, these examples can prevent adverse effects due to resistance and noise of current control transistors, maintaining high transmission quality since the current control transistors are not installed between AVDD and the node ND.

6) Sixth Example

Figure 17:
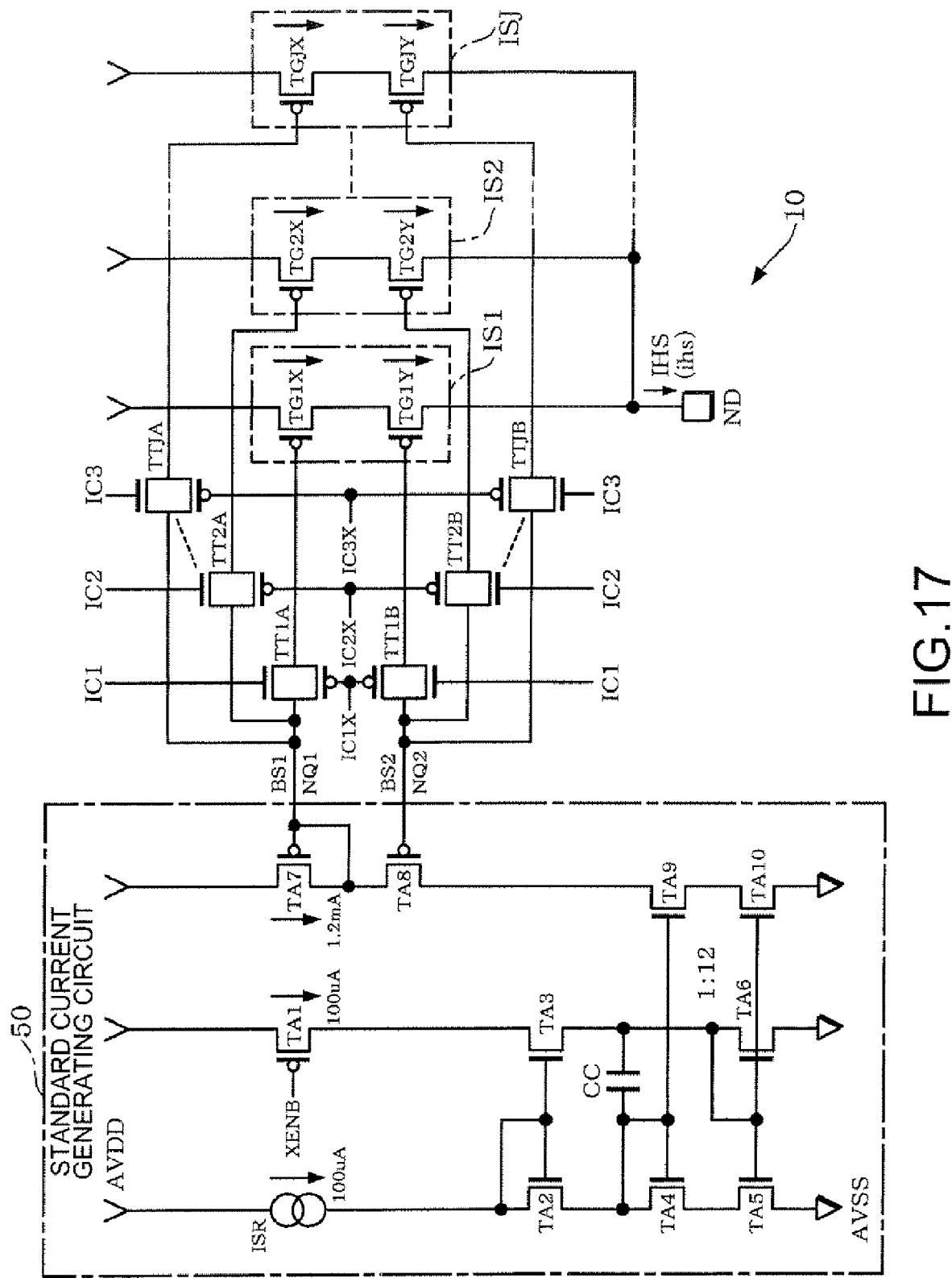
FIG. 17 shows a sixth example of the constant current circuit.

FIG. 17 shows a sixth example of the constant current circuit 10. In FIG. 17, the constant current circuit 10 includes the standard current generating circuit 50 and the first to J numbered current sources IS1 to ISJ between the first power source AVDD and the node ND. Further, the circuit 10 includes gates of transistors constituting the current sources IS1 to ISJ and transfer gates TT1A, TT1B, TT2A, TT2B, . . . TTJA and TTJB (current control switching elements in a broader sense) installed between the output nodes NQ1 and NQ2 of the bias voltages BS1 and BS2 from the standard current generating circuit 50. For example, transfer gates TT1A to TTJA are installed between the output node NQ1 and transistors TG1X to TGJX. Further, transfer gates TTLB to TTJB are installed between the output node NQ2 and transistors TGLY to TGJY.

In FIG. 17, the current ibx12 flows to the current source IS1. On the other hand, the current ib flows to the current sources IS2 to ISJ. Then, if the current control signals IC1 become active and the current control signals IC2 to ICJ become non-active, the current ihs=ibx12=14.4 mA flows to the node ND from the constant current circuit 10. Further, if the current control signals IC1 and IC2 are active, the current ihs=ibx12+ib=15.6 mA flows. If the current control signals IC1 to IC3 are active, the current ihs=ibx12+ibx2=16.8 mA flows. Then, if all the current control signals IC1 to ICJ become active and J=6, the current, ihs=ibx12+ibx5=20.4 mA flows. Accordingly, the current value ihs flowing from the constant current circuit 10 can be changed to 15.6 mA, 16.8 mA, 18.0 mA, 19.2 mA and 20.4 mA.

The sixth example in FIG. 17 does not need the current control transistors between AVDD and the node ND, which is different from the examples in FIG. 12 to FIG. 14. Accordingly, the example can prevent diverse effects such as resistance and noise generated from current control transistors, maintaining high transmission quality.

7. Data Transfer Control Device

Figure 18:
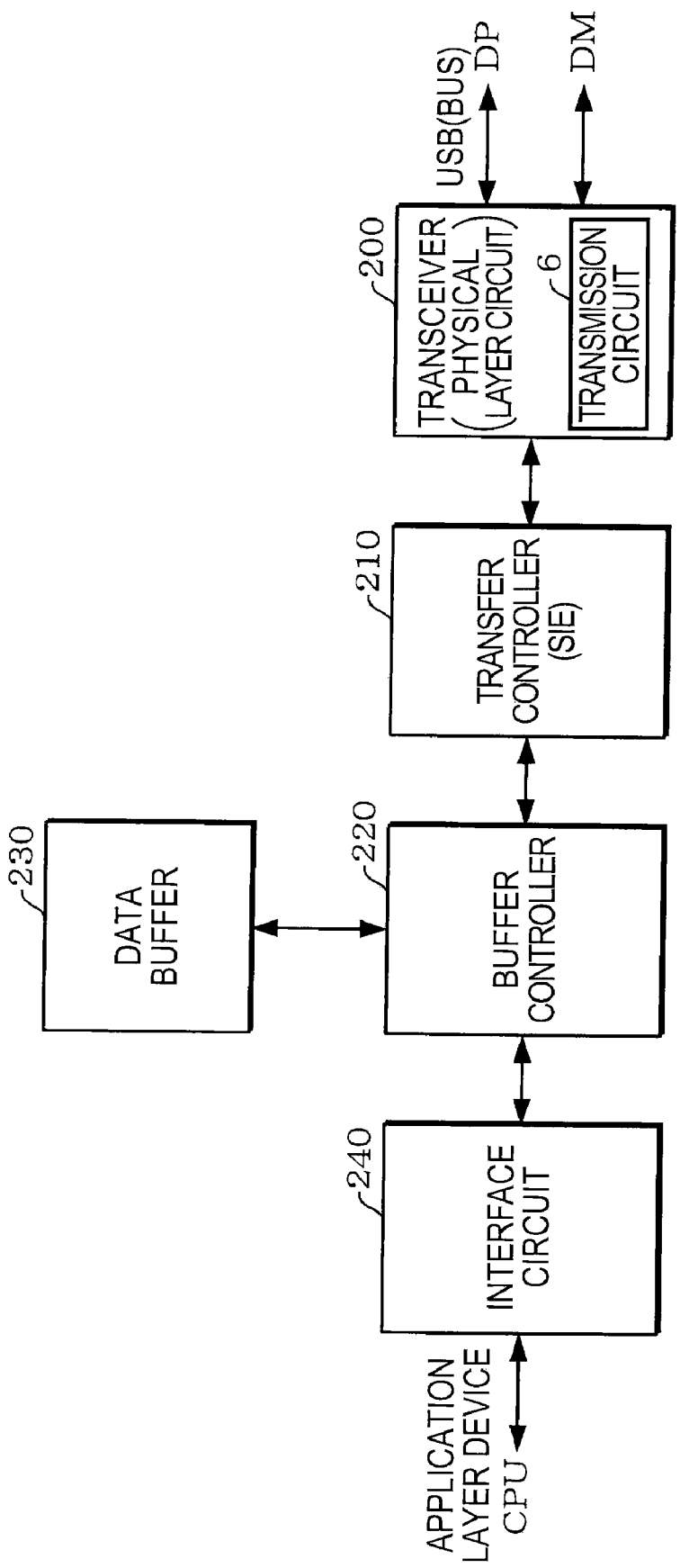
FIG. 18 shows an example of a data transfer control device.

FIG. 18 shows an example of a data transfer control device according to the embodiment. The data transfer control device in FIG. 18 includes a transceiver 200, a transfer controller 210, a buffer controller 220, a data buffer 230 and an interface circuit 240. Here, a part of these circuit blocks may be omitted, coupling states among circuit blocks may be changed and other circuit blocks may be added. The buffer controller 220, the data buffer 230 and the interface circuit 240 may be omitted, for example.

The transceiver 200 (a physical layer circuit) transfers and receives data via the signal lines DP and DM (a differential data signal line and a serial bus) and includes the signal transmission circuit 6 (the transmission driver for HS) explained in the embodiment. A circuit based on UTMI (USB 2.0 Transceiver Macrocell Interface) specification can be used for the transceiver 200.

The transfer controller 210 controls data transfer via USB and works as a serial interface engine (SIE). The transfer controller 210 processes packet handling, controls suspending & resuming, or managing transaction. The transfer controller 210 may include a link controller and a transaction controller not shown in the figure.

The buffer controller 220 ensures a memory region (an end point region) in the data buffer and controls access to a memory region in the data buffer 230. More specifically, the buffer controller 220 controls access to the region from an application layer device via the interface circuit 240, a CPU via the interface circuit 240 or a USB (the transfer controller 210), performs arbitration for these accesses and generates and manages access addresses.

The data buffer 230 (a packet buffer) is a FIFO buffer which temporarily stores (buffers) data (transmission data or receiving data) transferred via USB. The data buffer 230 includes memory such as RAM.

The interface circuit 240 is a circuit for a direct memory access (DMA) bus to be connected to an application layer and an interface via a CPU bus to be connected to a CPU. The interface circuit 240 includes a DMA handling circuit for DMA transfer.

8. Electronic Device

Figure 19:
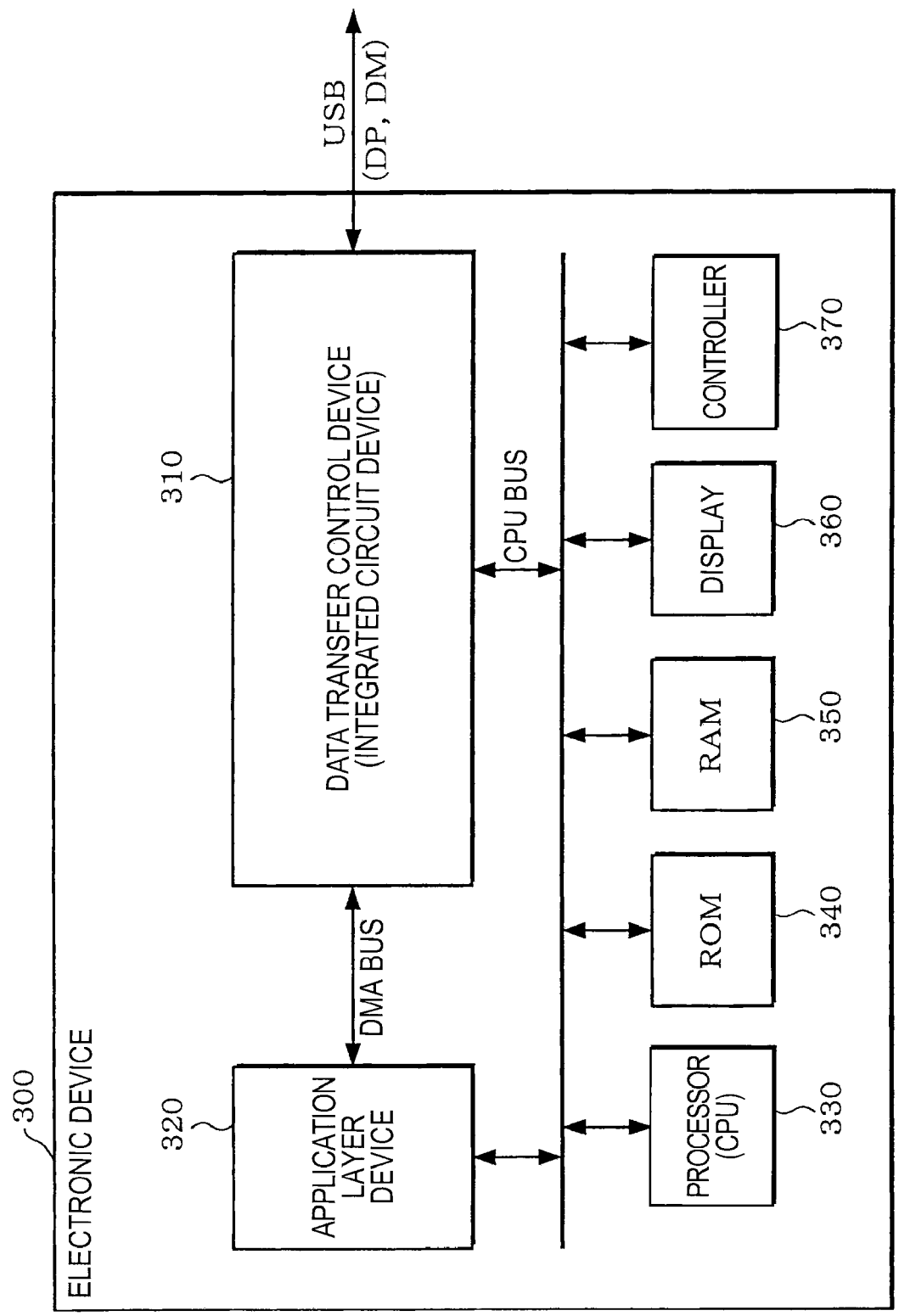
FIG. 19 shows an example of an electronic device.

FIG. 19 shows an example of an electronic device in the embodiment. An electronic device 300 includes a data transmission control circuit 310, an application layer device 320 having an ASIC, a CPU 330, a ROM 340, a RAM 350, a display 360 and a controller 370. Here, a part of these function blocks may be omitted.

Here, the application layer device 320 is a device such as an application engine for a mobile phone, a controller for driving an information memory media (a hard disk or an optical disk), a controller for a printer, an MPEG encoder, and an MPEG decoder. The processor 330 (CPU) controls the data transmission control device 310 and the entire electronic device. The ROM 340 memorizes control programs and various data. The RAM 350 functions as a work region or data-storing region for the processor 330 and the data transmission control circuit 310. The display 360 displays various information for a user. A user manipulates the controller 370 for an electronic device.

The DMA bus is separated from the CPU bus in FIG. 19, but these buses may be commonly integrated. Further, a processing portion for the data transmission controller 310 may be installed separated from a processing portion for the electronic device.

As the electronic device 300 of the embodiment, a mobile phone, a mobile music player, a mobile video player, a video camera, an optical disk drive device, a hard disk drive device, an audio device, a mobile game player, an electronic note, an electronic dictionary, a mobile information terminal and the like are cited.

Here, the details of the embodiments were explained in the above, but a skilled person in the art easily understands that any modifications can be available within the scope of the invention and its advantage. Namely, such modifications are within the range of the invention. For example, in the specification and drawings, some terminologies (AVDD, AVSS, DP, DM and others) were used at least one time accompanied with broader or the same meaning, but different terminologies (a first power source, a second power source, a first signal line, a second signal line and others). These terminologies can be substituted with different terminologies in any part of the specification or drawings. Further, a signal transmission circuit, a data transfer controller, circuit blocks of an electronic device and these operations are not limited to the embodiments of the invention but can be modified. Further, in the embodiments, the invention was applied to USB 2.0. But, the invention can be also applied to any other standards similar to the concept of the USB 2.0 or newly developed versions of it.

What is claimed is:

1. A signal transmission circuit transmitting signals via a differential pair including first and second signal lines, comprising:
   a current source installed between a first power source and a node;
   a first switching element installed between the first signal line and the node;
   a second switching element installed between the second signal line and the node;
   a current control circuit varying a value of a current that flows through the current source, wherein the first and second signal lines are operated by the current from the current source via the first and second switching elements, the current being varied by the current control circuit;

a first buffer outputting a first transmission control signal to the gate of a first transistor formed in the first switching element; and a second buffer outputting a second transmission control signal to the gate of a second transistor formed in the second switching element, wherein, if either of the first transmission control signal and the second transmission control signal is set active, the other of the control signals is set non-active;

wherein the first and second buffers each include:
  a first inverter;
  a second inverter having an input node that is coupled to the output node of the first inverter; and
  a capacitance adjustment circuit that is coupled between the output node of the first inverter and a second power source.

2. The signal transmission circuit according to claim 1, wherein the capacitance adjustment circuit includes:
  at least one switching element for adjusting capacitance, of which one end is coupled to the output node of the first inverter and turned ON or OFF by a capacitance adjustment signal; and
  at least one capacitance element of which one end is coupled to the other end of the switching element and the other end is coupled to the second power source.

3. The signal transmission circuit of claim 1 wherein the second power source is a ground potential.

4. The signal transmission circuit of claim 1 wherein the capacitance adjustment circuits adjust waveforms of the first and second transmission control signals, respectively.

* * * * *